US012783424B2

(12) United States Patent
Arunkumar et al.

(10) Patent No.: US 12,783,424 B2
(45) Date of Patent: Nov. 3, 2026

(54) METHOD AND APPARATUS TO CACHE KEY-VALUE DATA IN LOW-PRECISION NUMERICS FOR EFFICIENT GENERATIVE TRANSFORMER EXECUTION

(71) Applicant: d-MATRIX CORPORATION, Santa Clara, CA (US)

(72) Inventors: Akhil Arunkumar, Santa Clara, CA (US); Satyam Srivastava, Santa Clara, CA (US); Aayush Ankit, Santa Clara, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 149 days.

(21) Appl. No.: 18/950,792

(22) Filed: Nov. 18, 2024

(65) Prior Publication Data

US 2025/0110885 A1 Apr. 3, 2025

Related U.S. Application Data

(63) Continuation of application No. 18/477,334, filed on Sep. 28, 2023, now Pat. No. 12,182,028.

(51) Int. Cl.
*G06F 12/0895* (2016.01)
*G06F 12/02* (2006.01)

(52) U.S. Cl.
CPC ...... *G06F 12/0895* (2013.01); *G06F 12/0207* (2013.01)

(58) Field of Classification Search
None
See application file for complete search history.

(56) References Cited

U.S. PATENT DOCUMENTS

2021/0390382 A1* 12/2021 Kwon .................... G06N 3/065
2023/0144556 A1* 5/2023 Zhao ...................... G06F 17/142 708/190
2024/0134606 A1* 4/2024 Yi ......................... G06F 7/5443
2024/0202275 A1* 6/2024 Burr ......................... G06F 17/16

* cited by examiner

*Primary Examiner* — Stephanie Wu
(74) *Attorney, Agent, or Firm* — Ogawa P.C.

(57) ABSTRACT

A transformer compute apparatus and method of operation therefor. The apparatus receives matrix inputs in a first format and generates projection tokens from these inputs. Among others, the apparatus includes a first cache device configured for processing first projection tokens and a second cache device configured for processing second projection tokens. The first cache device stores the first projection tokens in a first cache region and stores these tokens converted to a second format in a second cache region. The second cache device stores the second projection tokens converted to the second format in a first cache region and stores the converted second projection tokens after being transposed. Then, a compute device performs various matrix computations with the converted first projection tokens and transposed second projection tokens. Re-processing data and expensive padding and de-padding operations for transposed storage and byte alignment can be avoided using this caching process.

28 Claims, 25 Drawing Sheets

METHOD AND APPARATUS TO CACHE KEY-VALUE DATA IN LOW-PRECISION NUMERICS FOR EFFICIENT GENERATIVE TRANSFORMER EXECUTION

CROSS-REFERENCES TO RELATED APPLICATIONS

This application is a continuation of and claims priority to U.S. patent application Ser. No. 18/477,334, filed Sep. 28, 2023, which is hereby incorporated by reference for all purposes. The present application incorporates by reference, for all purposes, the following commonly owned patent application(s): U.S. patent application Ser. No. 18/336,778, filed Jun. 16, 2023.

BACKGROUND OF THE INVENTION

The present invention relates generally to integrated circuit (IC) devices and artificial intelligence (AI). More specifically, the present invention relates to methods and device structures for accelerating computing workloads, such as those in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and methods to accelerate compute workloads for AI are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads, such as those in transformer-based neural network models (a.k.a. transformers) and the like. These methods and structures can be used in machine/deep learning applications such as natural language processing (NLP), computer vision (CV), and the like. Merely by way of example, the invention has been applied to AI accelerator apparatuses and chiplet devices configured in a PCIe card.

According to an example, the present invention relates to processing transformer workloads in a transformer compute apparatus. In certain applications, it is desirable to improve the handling of large data sizes. For example, transformer-based modeling networks typically involve an enormous number of elements (e.g., weights, activations, etc.) that cannot all be stored in on-chip memory. Thus, accessing these elements requires frequent transfers from a memory storage device (e.g., DDR), which can cause the processing of these elements to become memory bound due to the large latency of such memory operations. Additionally, quantizing the data into certain formats can pose challenges in cases in which the target matrix data is characterized by a changing contraction dimension due to redundant quantizations, potential accuracy reduction, and inefficient memory/cache transfers.

The transformer compute apparatus includes at least a crossbar device coupled to an input buffer (IB) device, a compute device, and output buffer (OB) device, a crossbar converter device, a cache memory device, and a memory device. The IB device is also coupled to the compute device, the compute device is also coupled to the OB device, and the OB device is also coupled to a Single Instruction, Multiple Data (SIMD) device. The cache memory device includes at least a first cache device and second cache device, and each of these cache devices includes at least a first cache region, a second cache region, and a third cache region.

The method of operating this transformer compute apparatus can include receiving a plurality of matrix inputs in a first format by the IB device. The plurality of matrix inputs is stored in the third cache region of each of the first and second cache devices. Also, the compute device determines first, second, and third projection tokens in the first format for each of the plurality of matrix inputs and outputs to the OB device. In a specific example, these projection tokens include Value, Key, and Query projections, respectively.

The plurality of first projection tokens are stored in the first cache region of the first cache device. In a specific example, these tokens are stored in an unblocked format. Then, the crossbar converter device determines a plurality of converted first projection tokens in a second format from the stored first projection tokens, and these converted first projection tokens are stored in a blocking configuration in the second cache region of the first cache device. In a specific example, the first format is a floating point (FP) format and the second format is a block floating point (BFP) format.

The plurality of second projection tokens are converted to a plurality of converted second projection tokens in the second format using the crossbar converter device. These converted second projection tokens are stored un-transposed in the blocking configuration in the first cache region of the second cache device. Then, a processor coupled to the crossbar device can perform a transpose operation on these converted second projection tokens resulting in a plurality of transposed second projection tokens, which are then stored in the second cache region of the second cache device.

The plurality of third projection tokens are also converted to a plurality of converted third projection tokens in the second format using the crossbar converter device. The third projection tokens and the converted third projection tokens can be stored in the memory device, or the transformer compute apparatus can further include a cache device configured to store the third projection tokens and the converted third projection tokens. In either case, the converted third projection tokens are also stored in the blocking configuration.

The compute device can be used to determine a plurality of score values using the plurality of converted third projection tokens from the memory device and the plurality of transposed second projection tokens from the second cache region of the second cache device. In a specific example, this process includes determining the dot products of the converted third projection tokens and the transposed second projection tokens. And, the SIMD device can apply a softmax operation to normalize these score values, which are outputted to the OB device and stored in the memory device.

Then, the compute device can be used to determine a plurality of weighted first projection tokens using the plurality of normalized score values from the memory device and the plurality of converted first projection tokens from the second cache region of the first cache device. In a specific example, this process includes multiplying the normalized score values with the converted first projection tokens. After these weighted tokens are outputted to the OB device and stored in the memory device, the compute device can accumulate these weighted tokens to determine a weighted tokens sum, which is outputted to the OB device and stored in the memory device as well. Further steps can be taken depending on the application. For example, the weighted tokens sum can then be sent along to a feed-forward neural network for further processing.

Embodiments of this transformer compute apparatus and its related methods can provide many benefits. Using these cache device configurations, can avoid repeating the blocking process of previous data when accumulating new data and avoid expensive padding and de-padding operations to support transposed storage and byte alignment. The apparatus can be configured in a low precision, high accuracy system for generative large language models (LLMs) with support for BFP numerics and storage. Further, these benefits can be realized in IC chips and chiplet devices with minimal added cost of silicon area.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
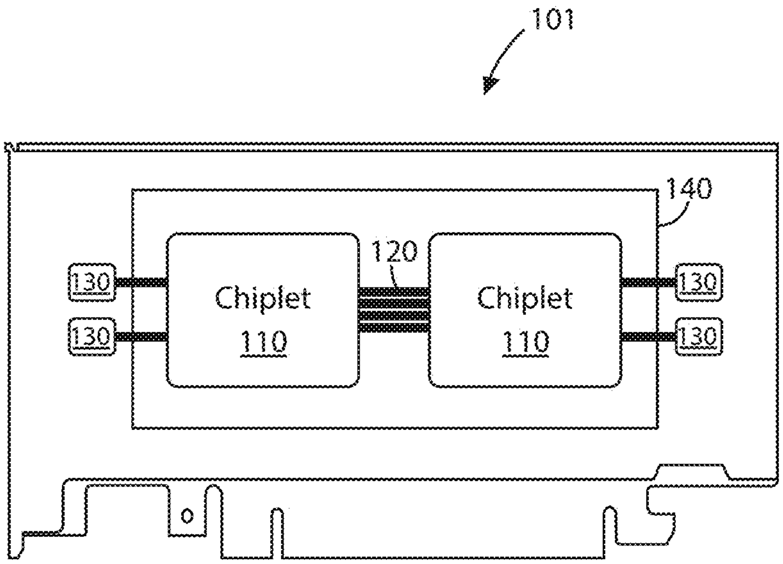
FIGS. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
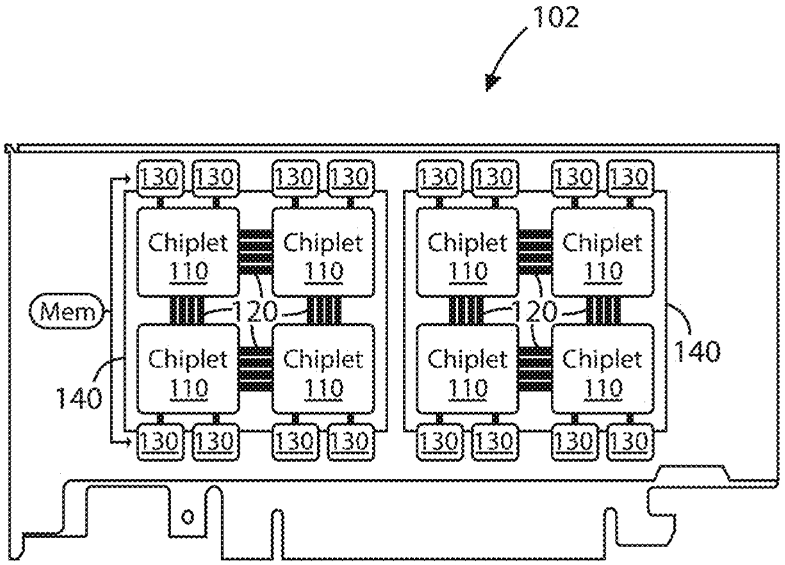

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
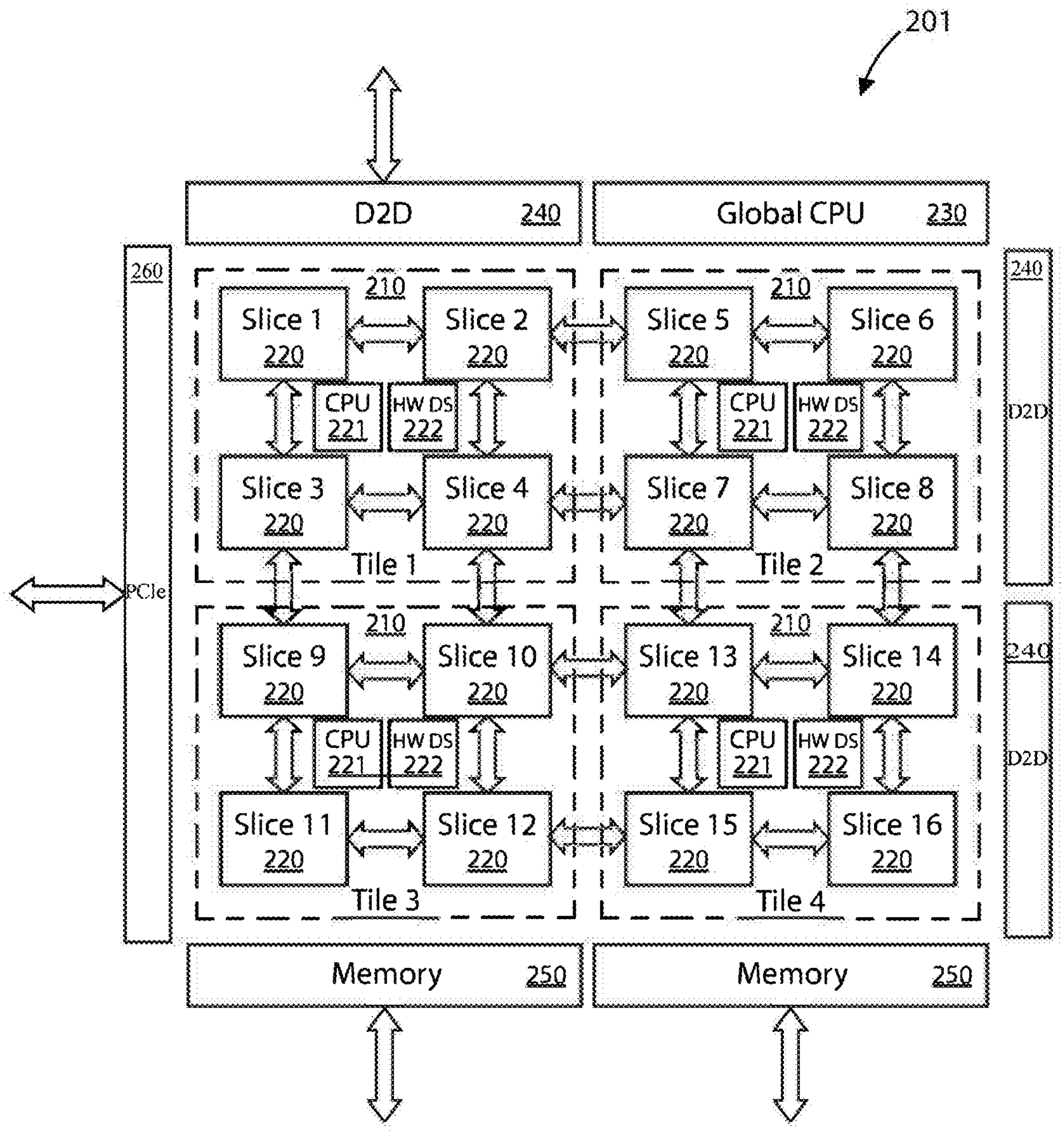
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
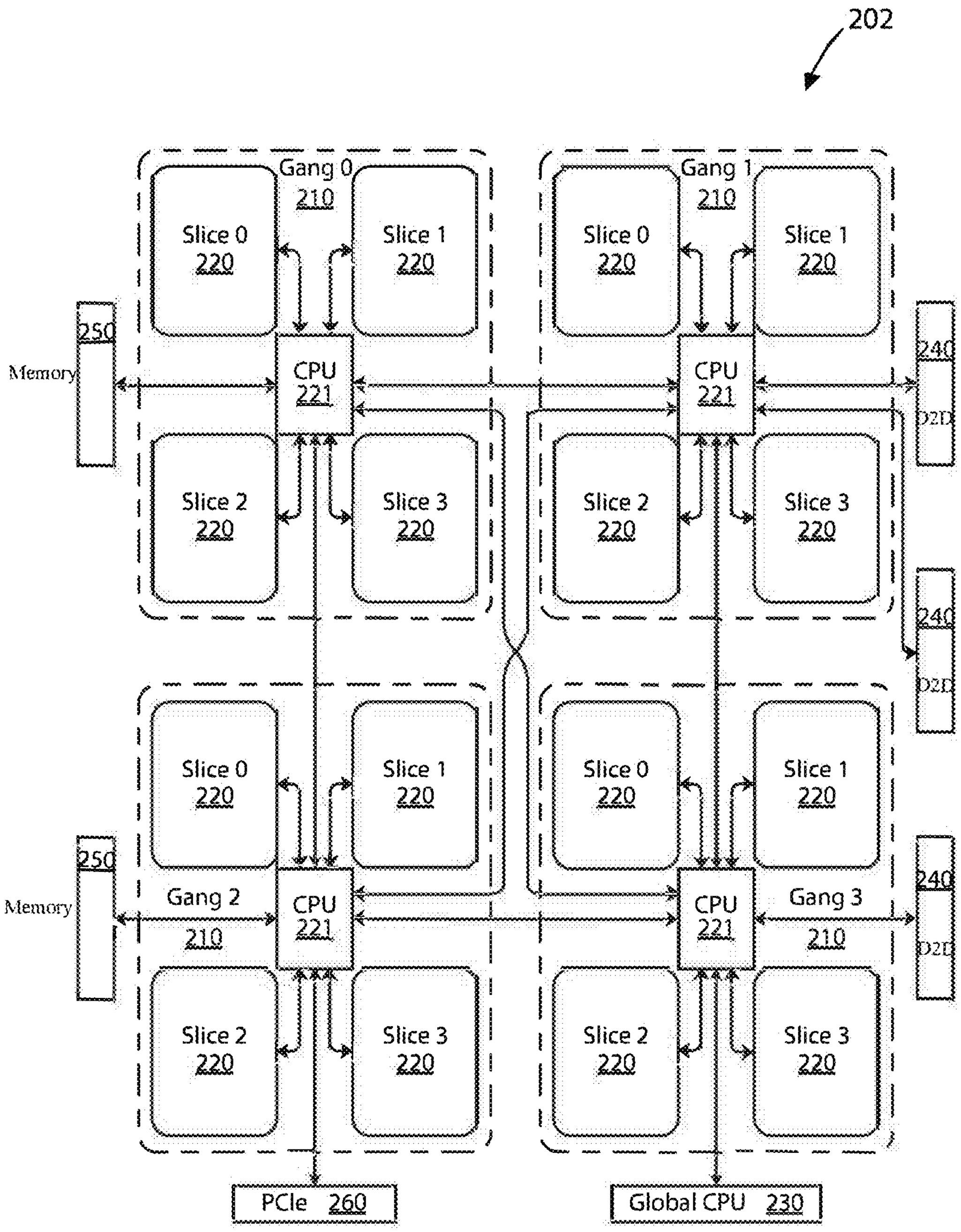

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
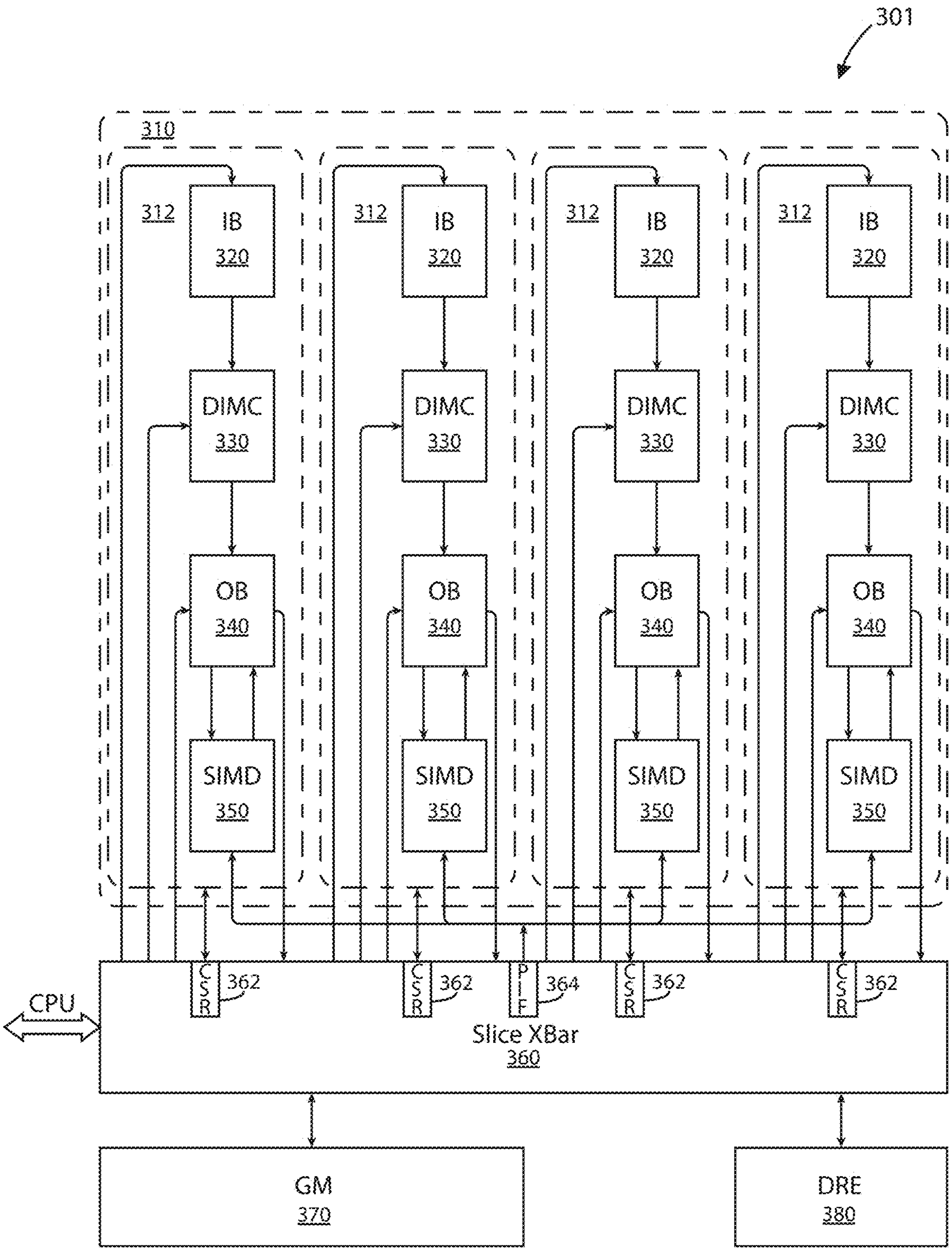
FIGS. 3A-3B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
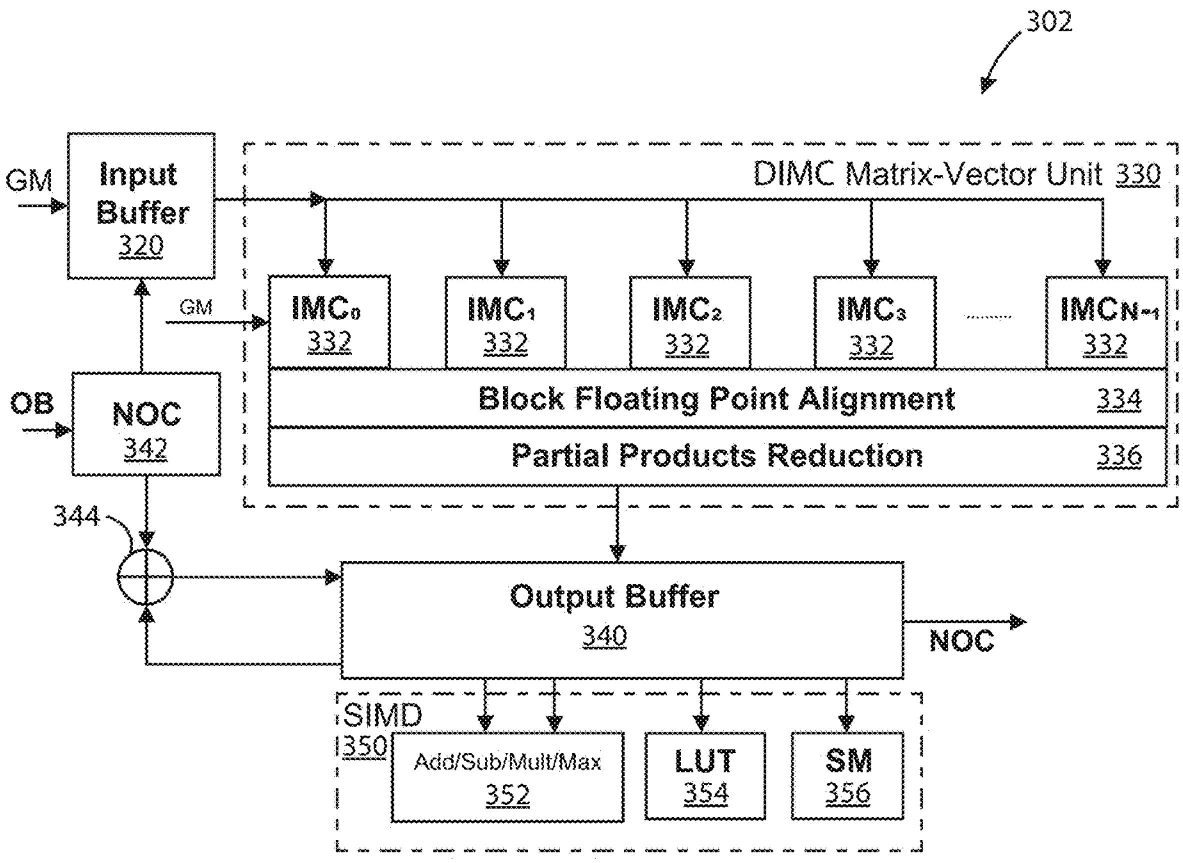

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can include a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations, as well as floating point computations, such as IEEE 854 float16 or float32. These slice components can vary depending on which transformer the AI accelerator apparatus will serve.

Figure 4:
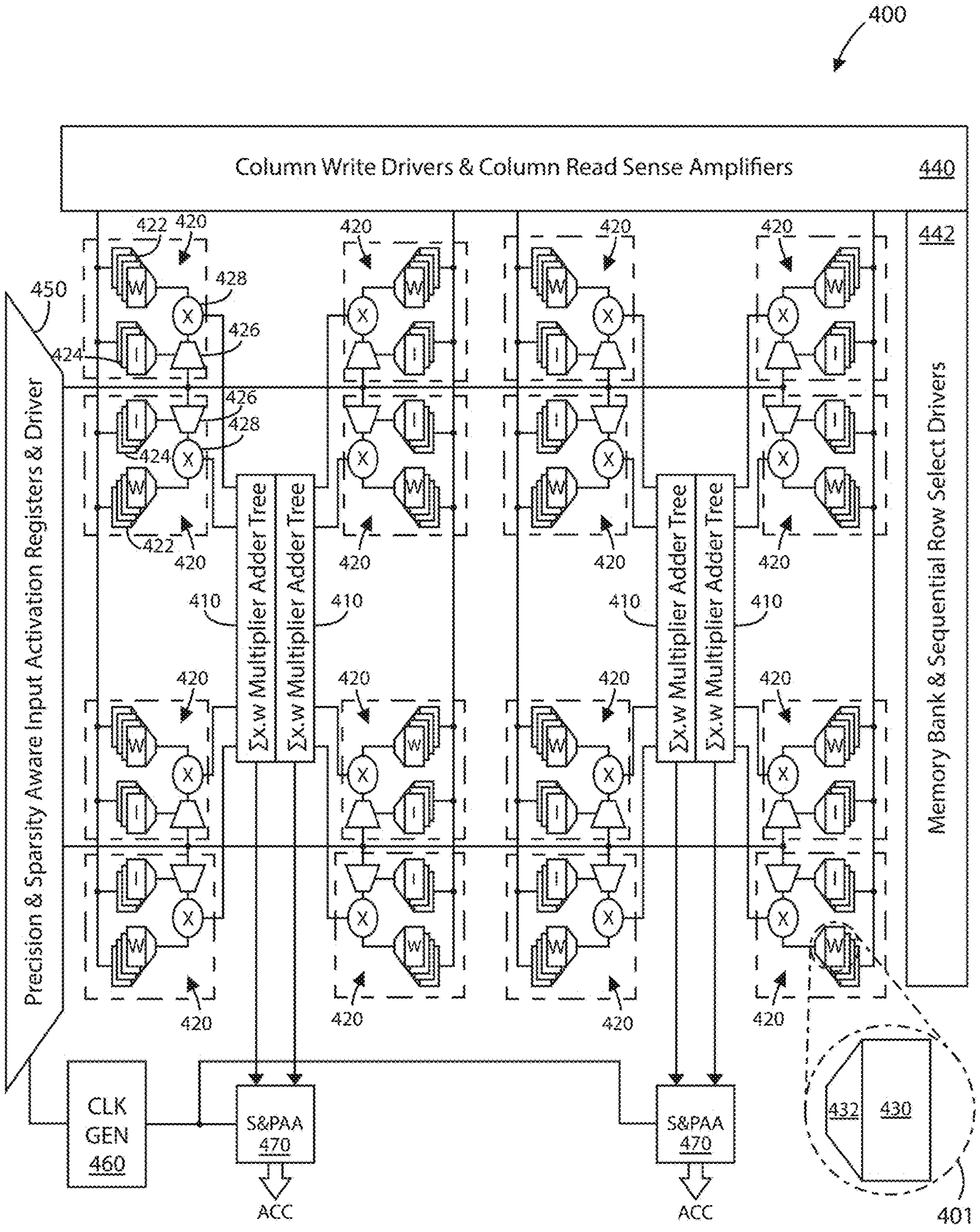
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., $\Sigma x \cdot w$).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

Figure 13A:
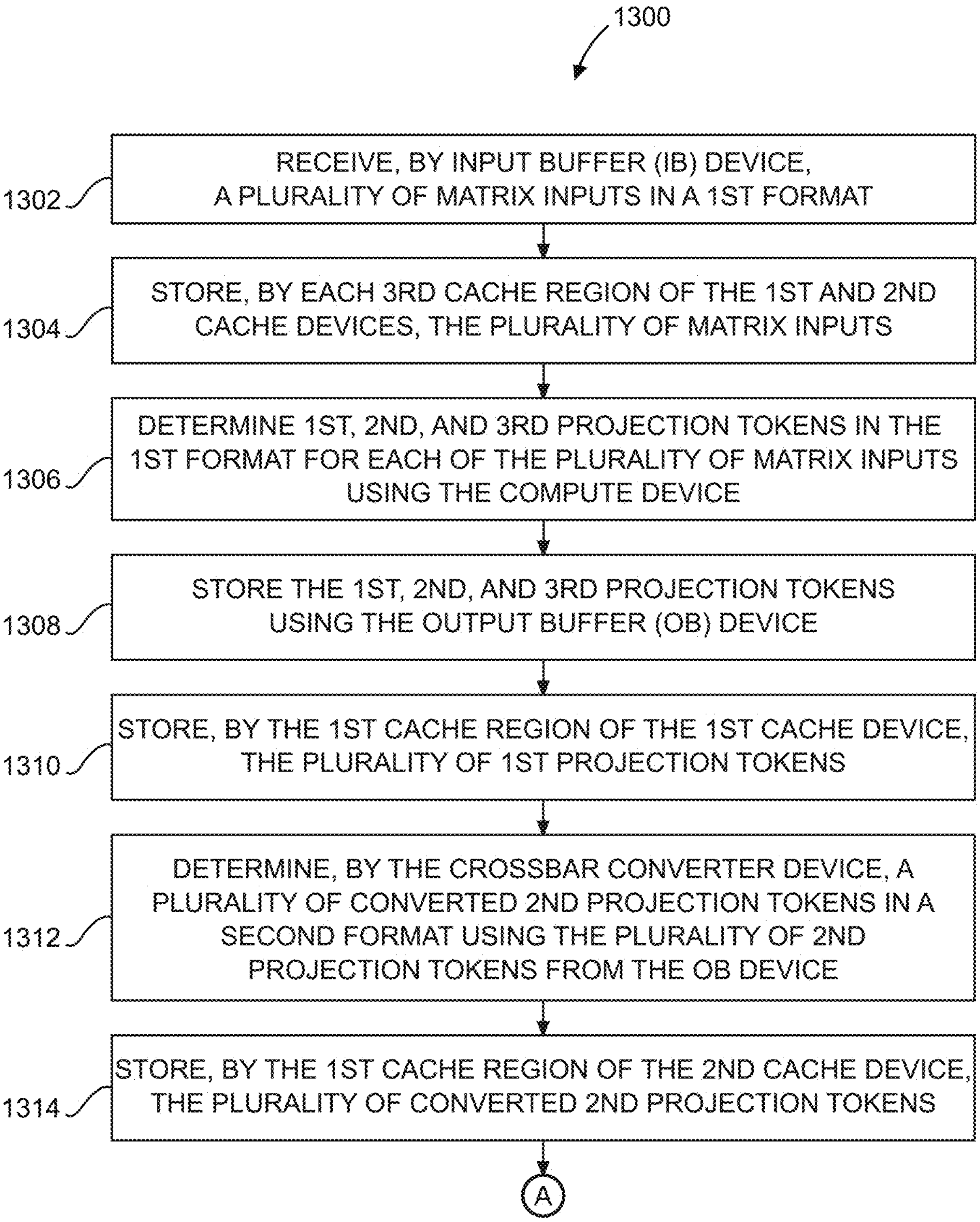
FIGS. 13A-13D illustrate a simplified flow diagram of a method of operating a transformer compute apparatus according to an example of the present invention.
Figure 13B:
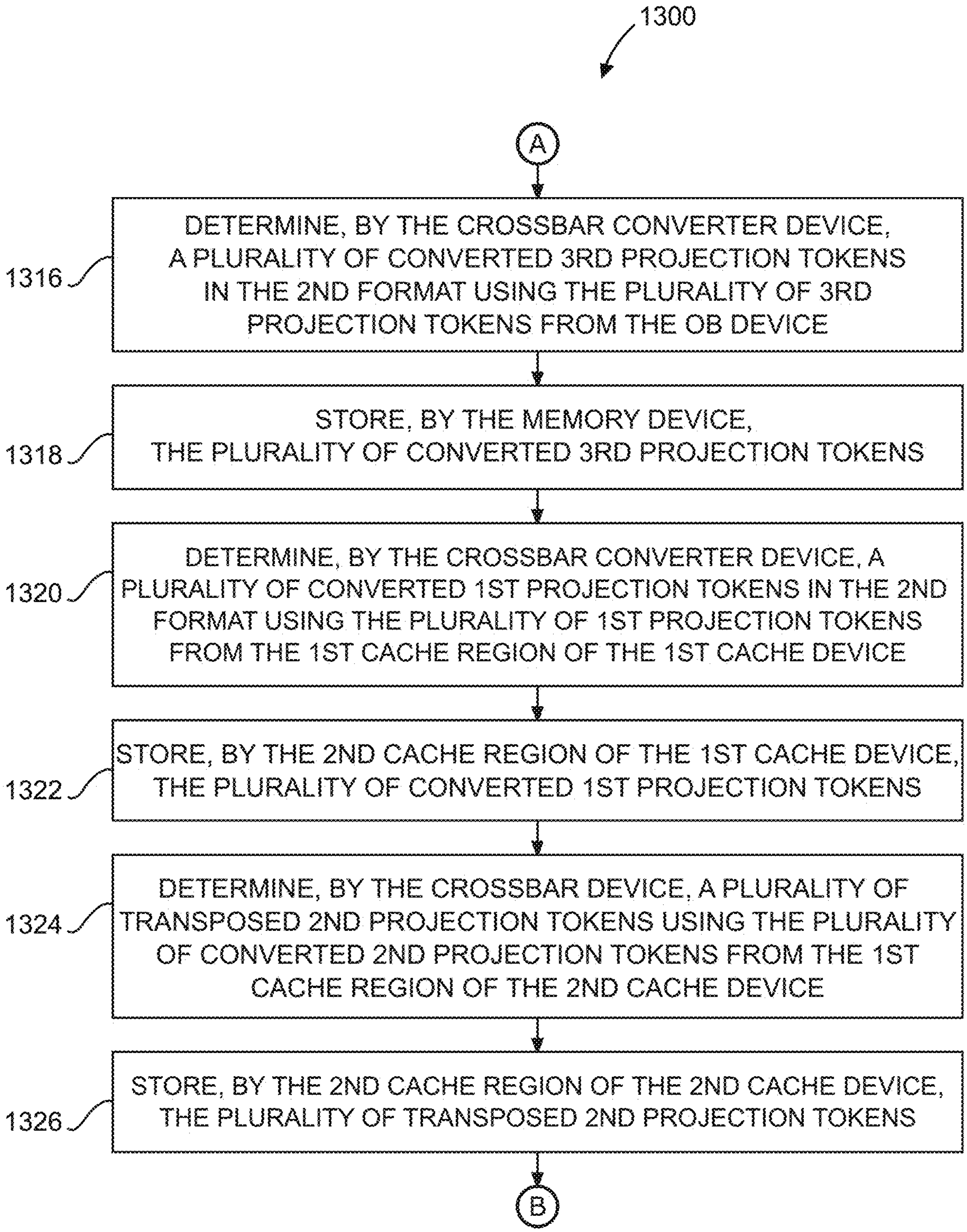
Figure 13C:
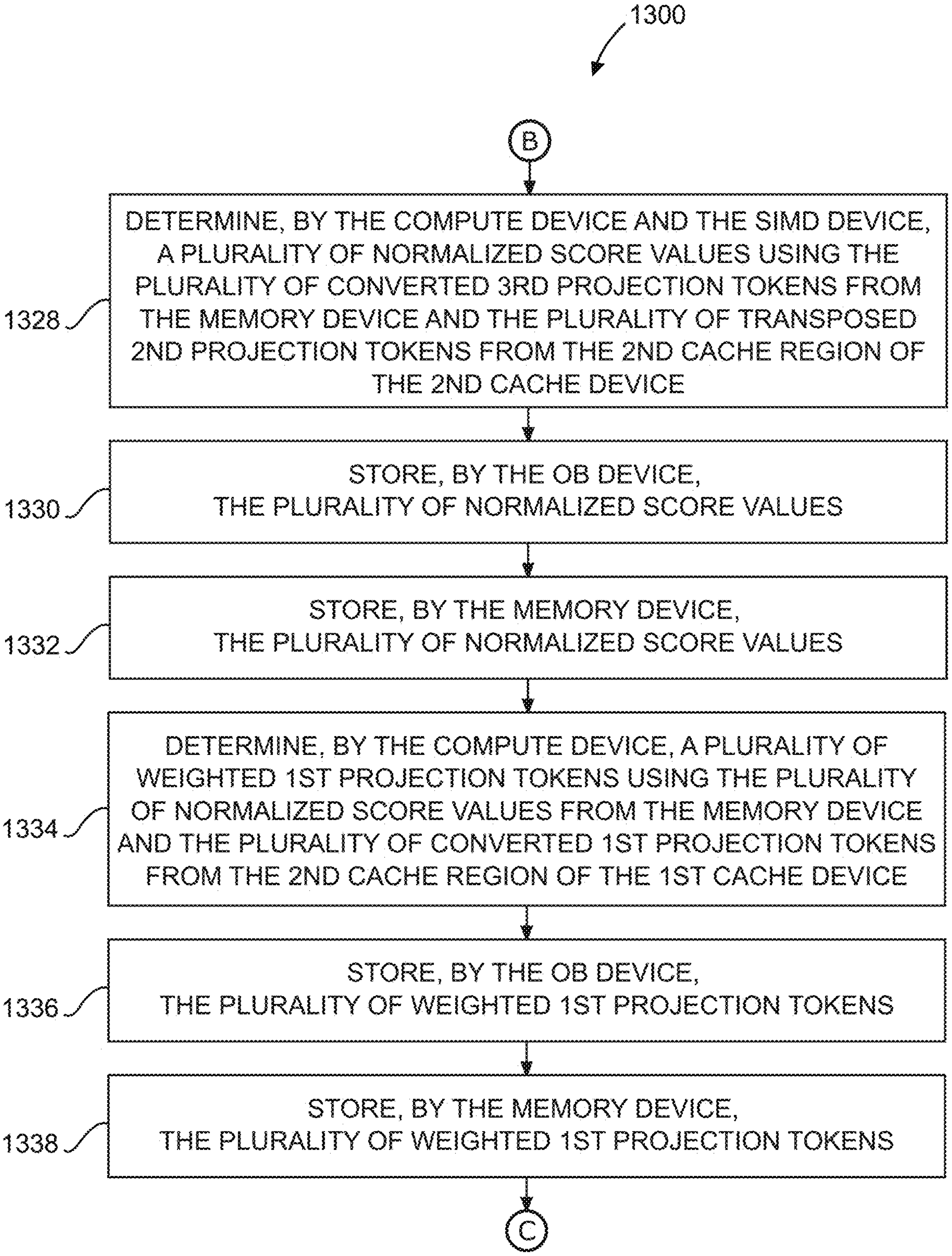
Figure 13D:
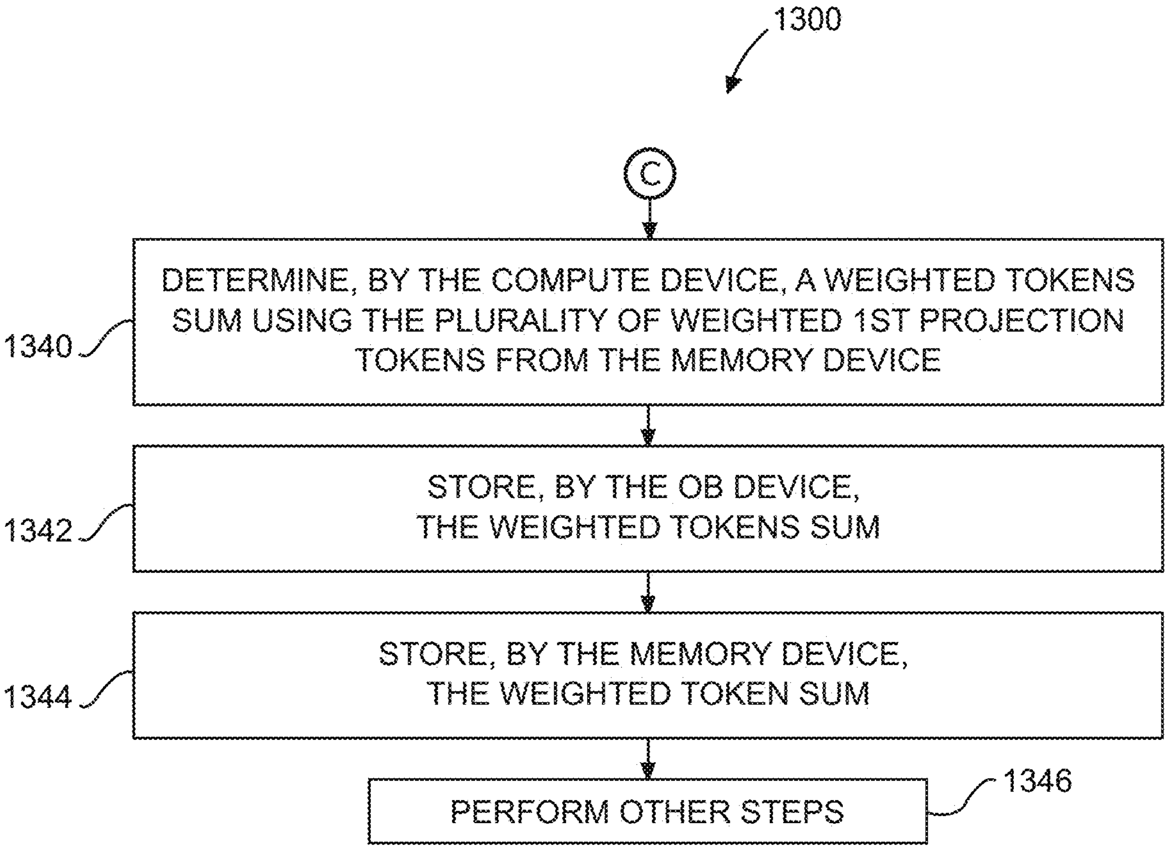

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
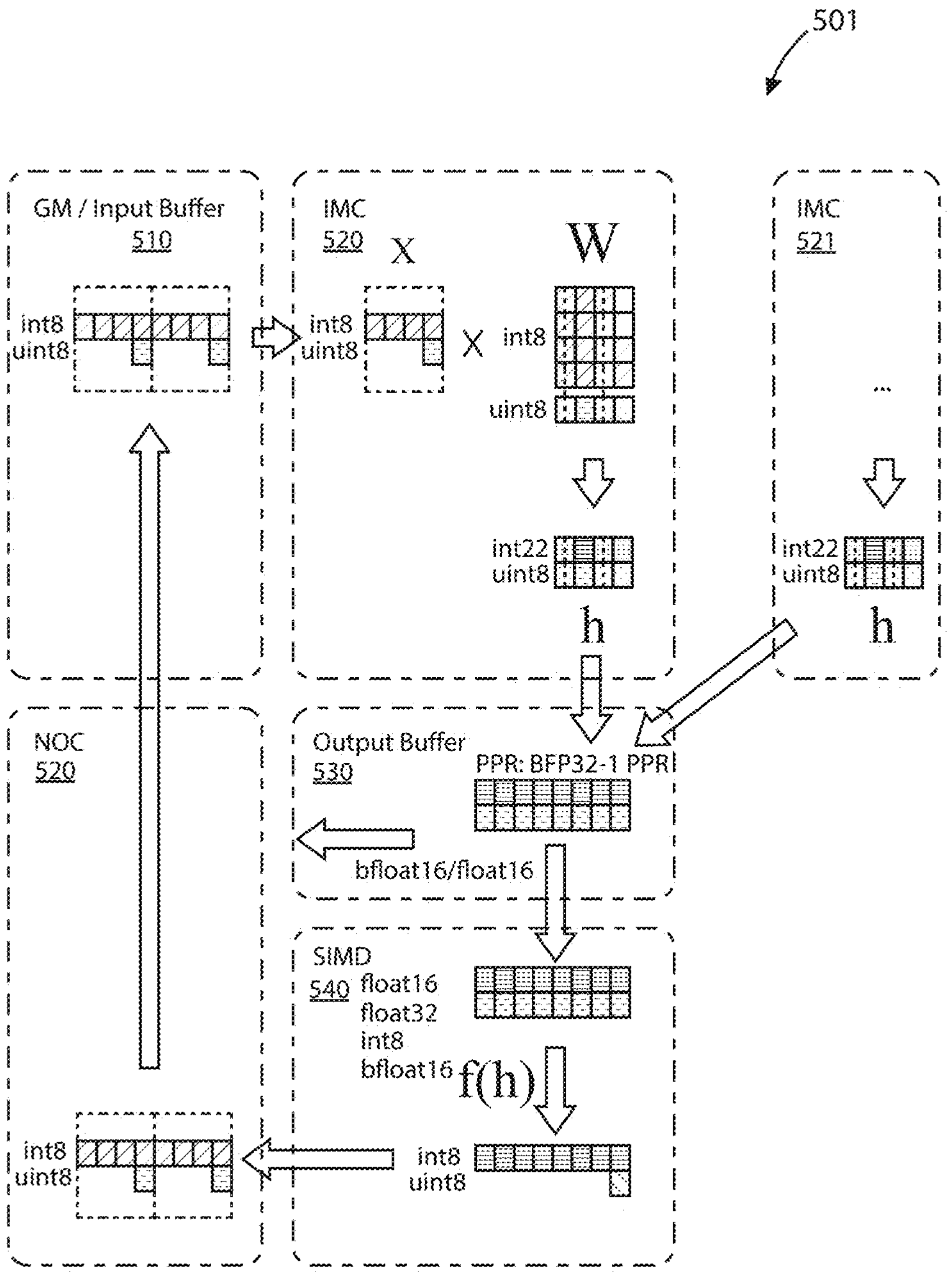
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation (Σx·w). Additionally, the format for the data from IMC 532 flows to the output buffer 530 as well. In this example, the numerical formats include integer (int), floating point (float), and block floating point (BFP) of varying lengths.

Figure 5B:
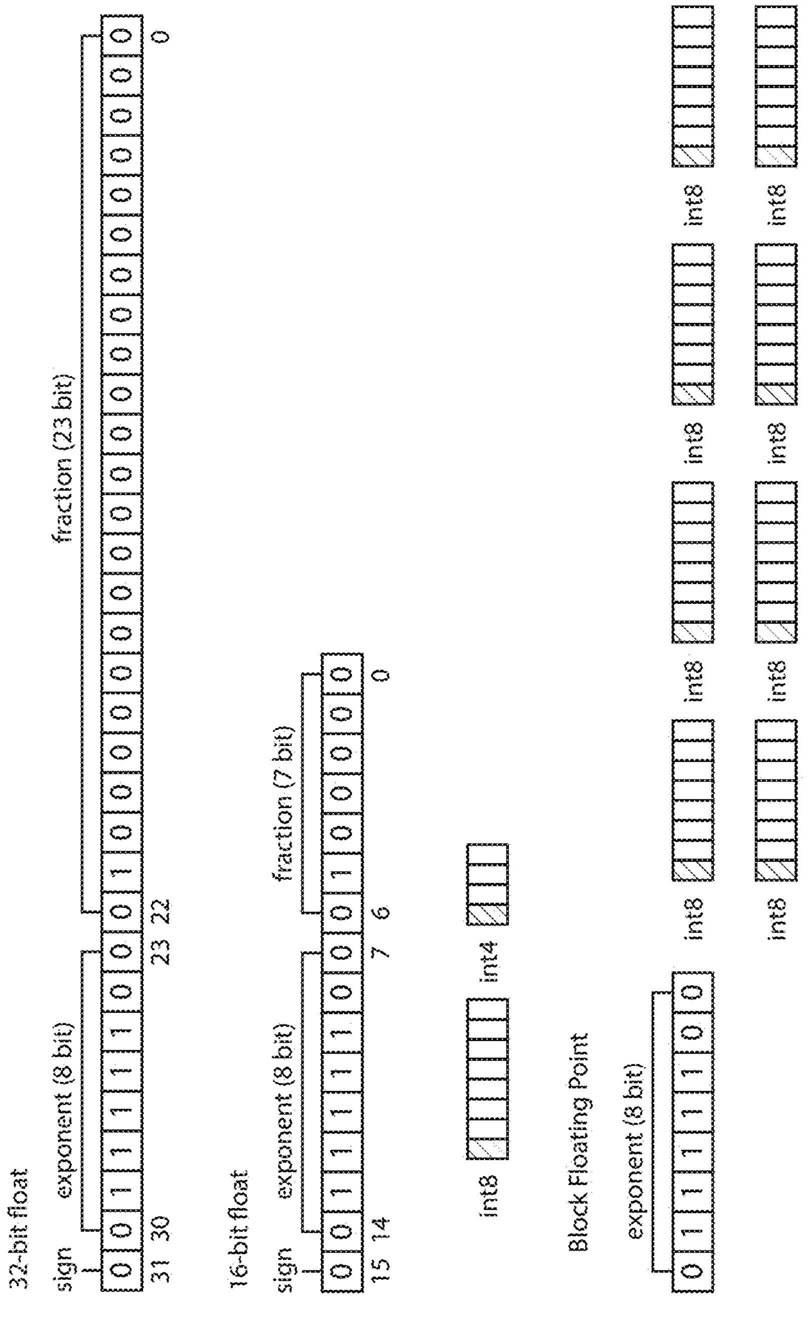
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for inference can exhibit the efficiency of fixed point without the accuracy and deployment problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6A:
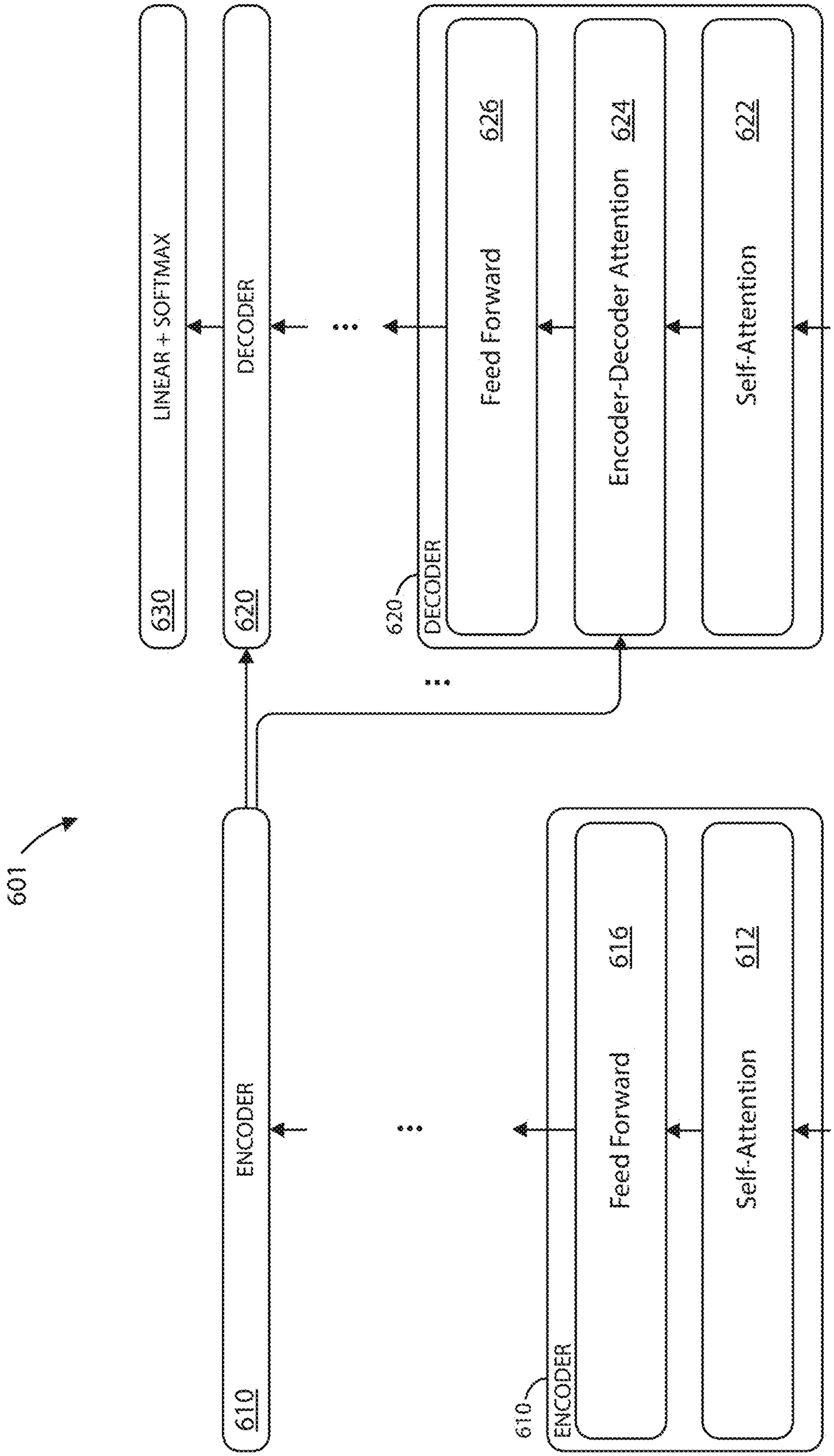
FIG. 6A is a simplified block diagram of a transformer architecture.

FIG. 6A illustrates a simplified transformer architecture 601. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the probability output, the projected word meaning may be chosen based on the highest probability or by other derived criteria depending on the application.

Figure 6B:
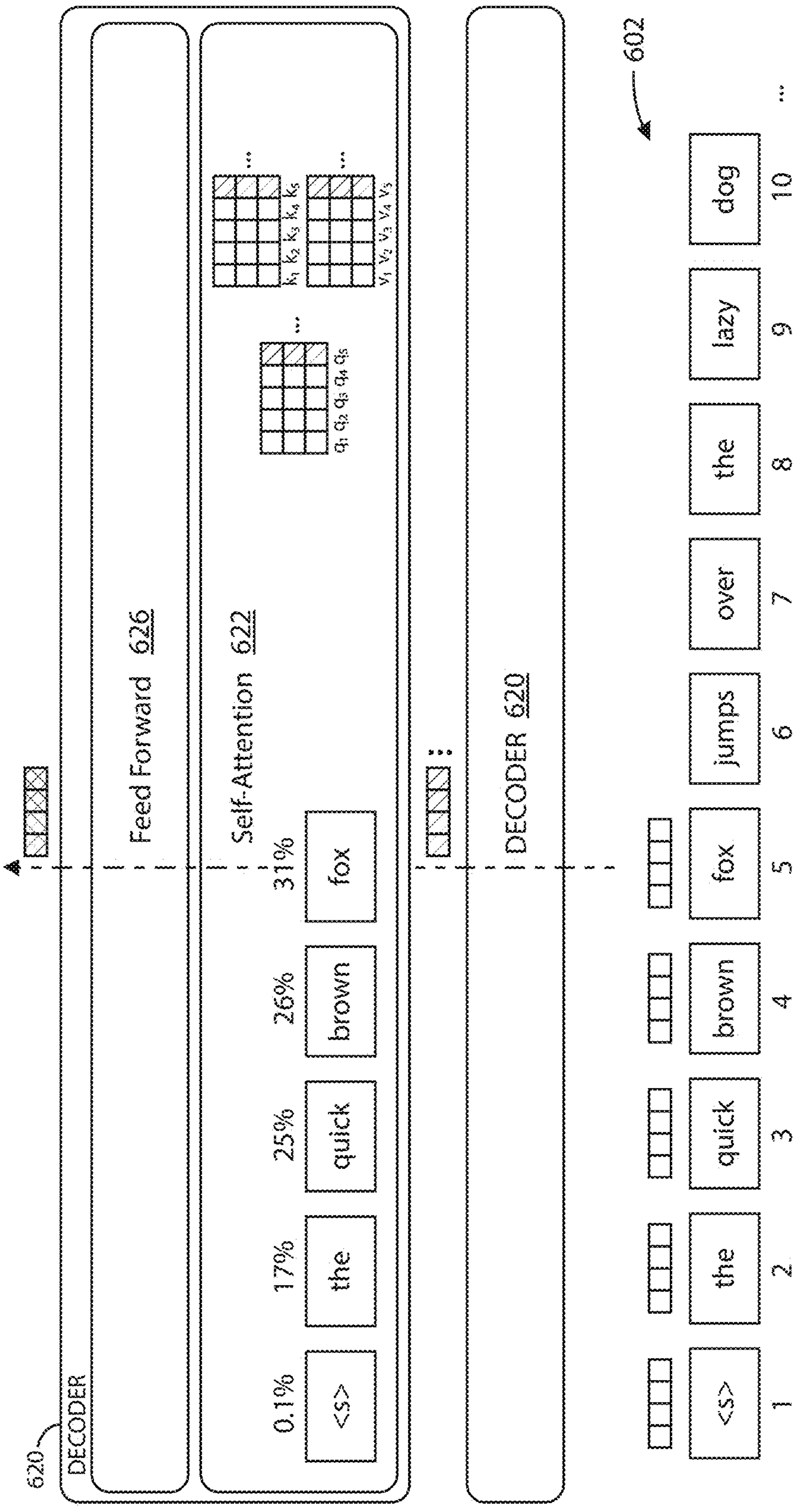
FIG. 6B is a simplified block diagram illustrating an autoregressive token processing method in a transformer decoder architecture.

An important transformer model class includes those based on just the decoder stack (e.g., transformer language models such as GPT-2, GPT-3, etc.), which pose particular challenges for inference. FIG. 6B illustrates an example autoregressive token processing method, which uses a decoder stack to process one token at a time from the segment 602 ("the quick brown fox jumps over the lazy dog"). This decoder stack includes a plurality of decoder layers 620, each with a self-attention layer 622 and a feed forward layer neural network 626. Here, the input token "fox" is being processed after the previous tokens "brown", "quick", "the", and the start token "<s>". In an example, query (Q), key (K), and value (V) vectors are created for each input token by multiplying each token with Q, K, and V weight matrices, respectively. The processing method for each token includes computing the dot product of the Q vector of the current token and the K vector of each token in the segment to determine the percentage scores for each token relative to the present token, as shown in the self-attention layer 622. In this case, the method includes a masked self-attention process which future tokens are scored as zero, thus the score values are only calculated for the present token and any preceding tokens. Then, the value vectors for each token are multiplied with its respective score value and all summed up, resulting in an output vector for the present token. The output vector for the given token is then passed to the next decoder layer 620 for further processing (shown by the shaded vectors following the dotted line arrow). As the Q, K, and V vectors are created for each token, the Q, K, and V matrices containing these vectors grow dynamically with each additional token (shown by the diagram on the right side of the self-attention layer 622).

Transformers are based on four parameters: sequence length(S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

The self-attention process includes (1) determining query (Q), key (K), and value (V) vectors for the embedding of each word in an input sentence, (2) calculating a score from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output. Note that the value matrix V becomes the weight matrix for matrix multiplication with softmax attention matrix; in the context of block floating point numerics, this requires a column blocking converter for V as described below. The column wise blocking of V is more complicated in decoder transformer architectures where the V matrix grows one row at a time for each additional token input. For column wise blocking, this would require re-quantizing the last matrix tile to block floating point for each additional row of V.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers has a plurality of matrix multipliers including QKV matrices configured for an attention layer of a transformer followed by three fully-connected matrices (FC). In this configuration, the DIMC is configured to accelerate the transformer and further includes a dot product of Q $K^T$ followed by a softmax (Q $K^T$/square root ($d_k$)) V. In an example, the AI accelerator apparatus also includes a SIMD device (as shown in FIGS. 3A and 3B) configured to accelerate a computing process of the softmax function.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

Figure 7:
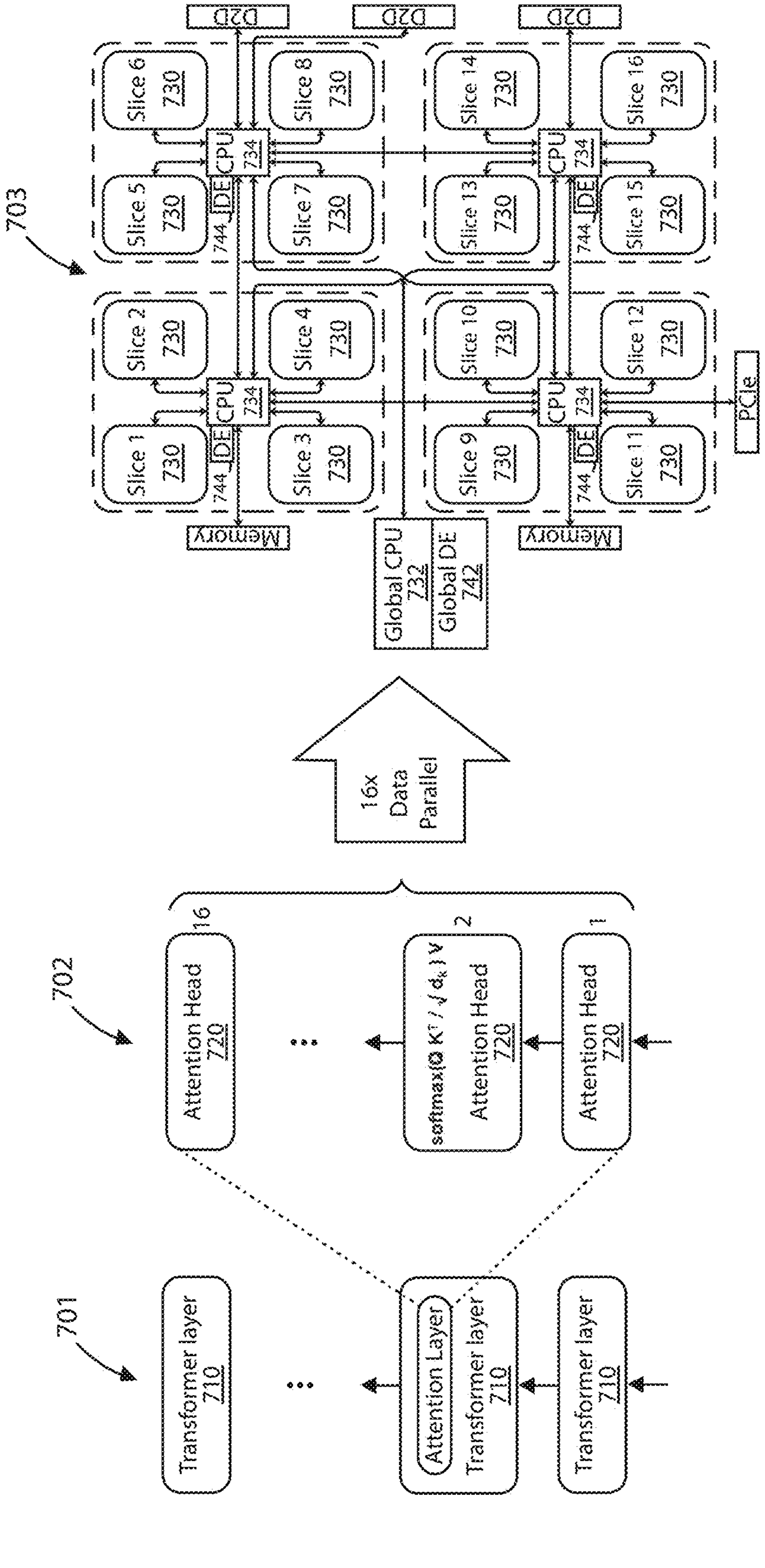
FIG. 7 is a simplified block flow diagram illustrating a mapping process between a transformer and an AI accelerator apparatus according to an example of the present invention.

FIG. 7 is a simplified block flow diagram illustrating a mapping process between a transformer and an example AI accelerator apparatus. As shown, a transformer 701 includes a plurality of transformer layers 710, each having an attention layer 702. In this case, there are 16 attention heads 720 (e.g., BERT Large) computing the attention function as discussed previously. These 16 attention heads are mapped to 16 slices 730 of an AI accelerator apparatus 703 (similar to apparatuses 201 and 202) via global CPU 732 communicating to the tile CPUs 734.

Figure 8:
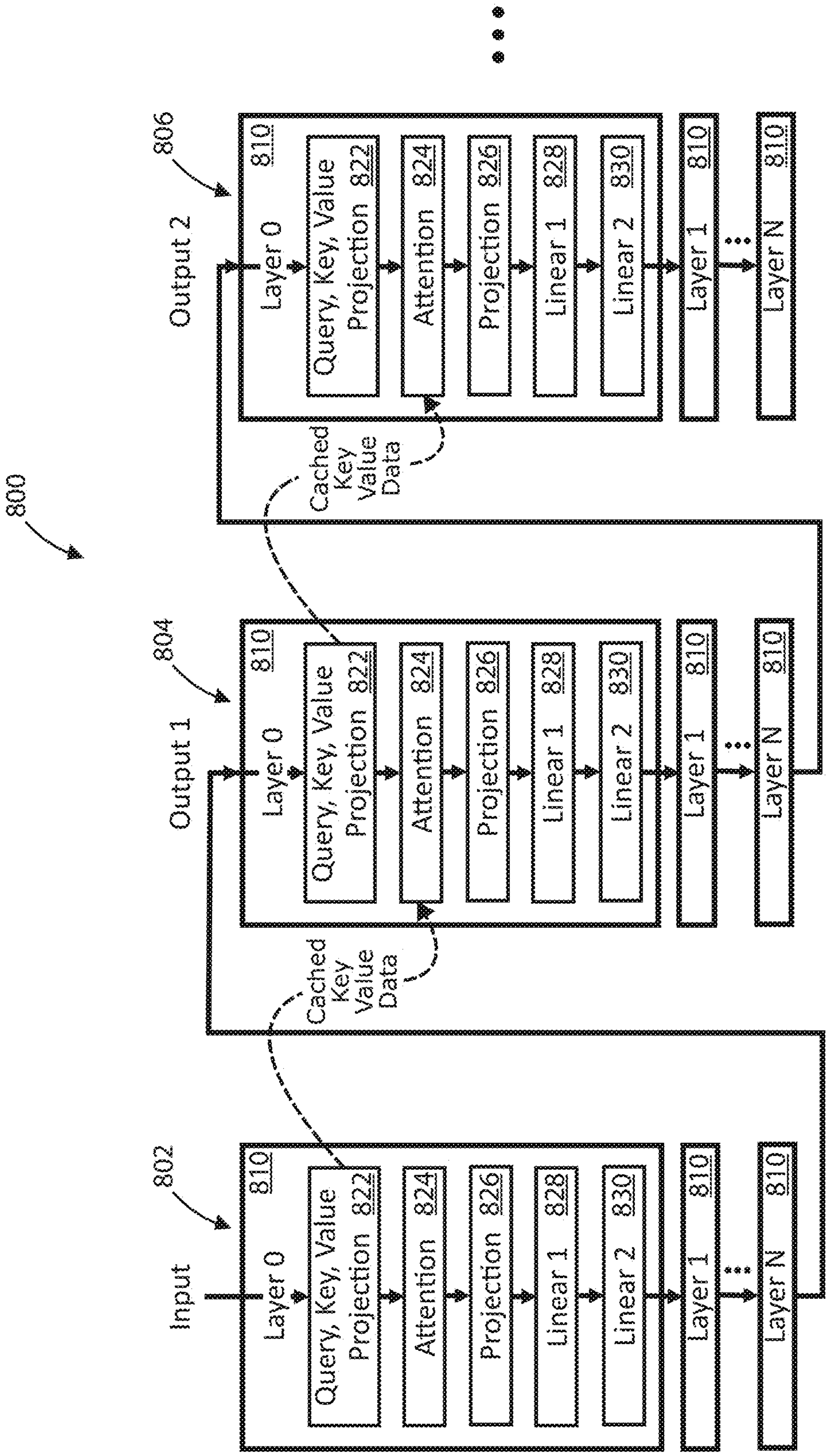
FIG. 8 is a simplified flow diagram 800 illustrating a method of operating a generative transformer model according to an example of the present invention.

FIG. 8 is a simplified flow diagram 800 illustrating a method of operating a generative transformer model according to an example of the present invention. The generative transformer model is represented by a plurality of layers 810, denoted "Layer 0" to "Layer N", configured to cyclically process input tokens using an attention mechanism. Each layer of this model includes at least the following steps/layers: a Query, Key, Value (QKV) projection layer 822; an attention layer 824; a projection layer 826; a first linear layer 828; and a second linear layer 830. In an example, these layers can correspond to the self-attention steps discussed previously.

In the QKV projection layer 822, three vectors (query, key, and value vectors) are created for each input token (e.g., embedding vector). These vectors are determined by multiplying the input token by three weight matrices trained during the training process. In the attention layer 824, a score is determined between a target token and each token in the sequence. This score is calculated by the dot product of the target token's query vector and the each token's key vector (in a transposed format).

In the subsequent projection layer 826, the scores by the square root on the dimension ($d_k$) of the key vectors, and a softmax operation is performed to normalize the scaled scores. Then, in the linear layers 828 and 830, each value vector is multiplied by the softmax score to determine weighted value vectors, and the weighted value vectors are added to produce the output for the target token.

In an example, these operations are condensed using matrix operations. The input tokens can be configured in a matrix and multiplied with the three weight matrices to produce query, key, and value matrices. The scores are determined by the dot product of the query and transposed key matrices, and the softmax of those scores after scaling is multiplied with the value matrix to determine an output matrix.

The plurality of layers 810 (Layers 0 to N) process the input tokens to produce an output, and the resulting output can be processed through the plurality of layers 810 again. As shown, the layers 810 receive the input tokens at step 802, and the output from the first cycle (denoted "Output 1") is fed through the layers 810 again to produce an output for the second cycle (denoted "Output 2"). In step 804, the previous output is processed through the plurality of layers 810 yet again. Along with the previous output, new input tokens can be introduced to the plurality of layers 810. This process can repeat until the desired result for the given application is obtained.

During this process, the generative model continuously reads and updates the key and value data. In an example, the key and value data is stored in one or more designated memory caches. As shown in FIG. 8, the cached key and value data from the QKV projection layer 822 of step 802 is used in the attention layer 824 of step 804 (shown by the dotted line arrow). Similarly, the cached key and value data from the QKV projection layer 822 of step 804 is used in the attention layer 824 of step 806, and so on and so forth. In this manner, the model only has to process new input tokens, as the previously processed input tokens do not need to be processed again. Of course, those of ordinary skill in the art will recognize other variations, modifications, and alternatives.

Figure 9:
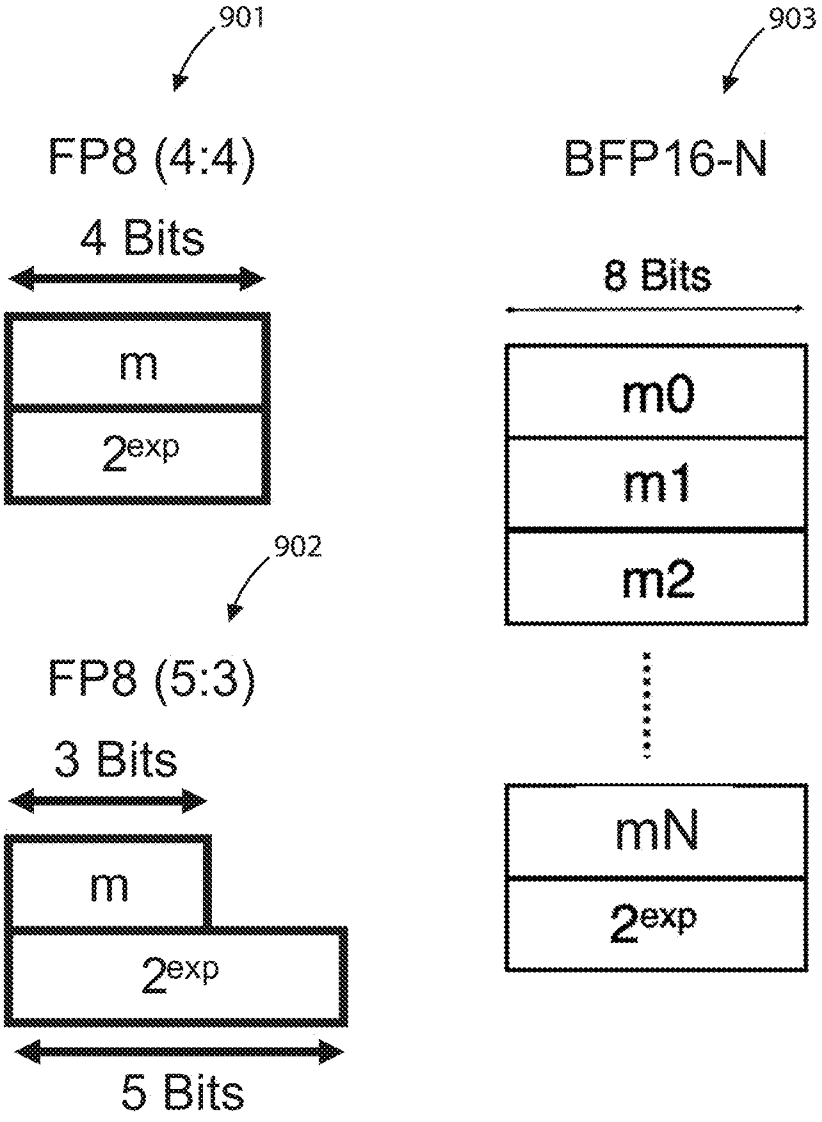
FIG. 9 is a simplified diagram illustrating numerical formats used in a transformer model according to an example of the present invention.

FIG. 9 is a simplified diagram illustrating numerical formats used in a transformer model according to an example of the present invention. As discussed previously, training of transformers is generally done in a floating point (FP) format. Here, the first 8-bit floating point (FP8) format 901 includes a 4-bit mantissa and a 4-bit exponent, while the second FP8 format 902 includes a 3-bit mantissa and a 5-bit exponent. Low precision formats, such as FP8, reduce the bits for both exponent and mantissa, which often results in high accuracy loss.

Blocked formats, such as block floating point (BFP), share the exponent for a number of elements. For example, the BFP16-N format 903 provides an 8-bit mantissa per element (e.g., 0 to N elements; N=16, 64, 125, etc.) and an 8-bit shared exponent per block. Such blocked formats allow for high precision and high range. In an example, use of the BFP16-N format 903 can include approximately 8-bit storage and 8-bit compute performance.

According to an example, the present invention provides for a matrix multiply compute apparatus using hybrid memory caches. These hybrid memory caches can be configured for accelerating computing workloads in transformer-based neural network models. In a specific example, these memory caches are configured for the key and value data computations in the generative transformer model discussed previously in FIG. 8. Although the following examples are discussed in the context of the key and value data computations, those of ordinary skill in the art will recognize other variations, modifications, and alternatives to the layout of the cache devices.

Figure 10A:
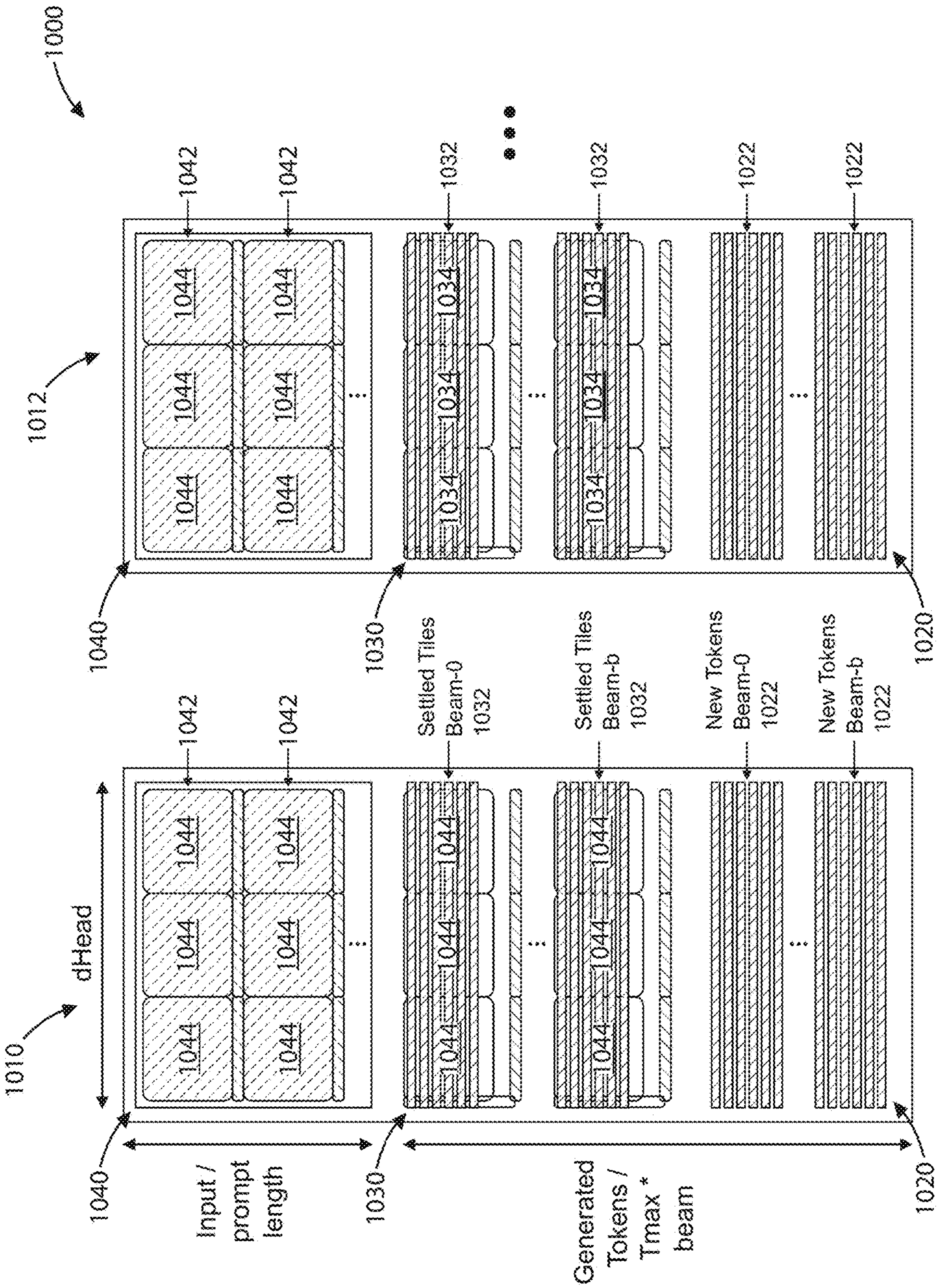
FIGS. 10A-10C are simplified block diagrams illustrating a hybrid memory cache device according to an example of the present invention.
Figure 10B:
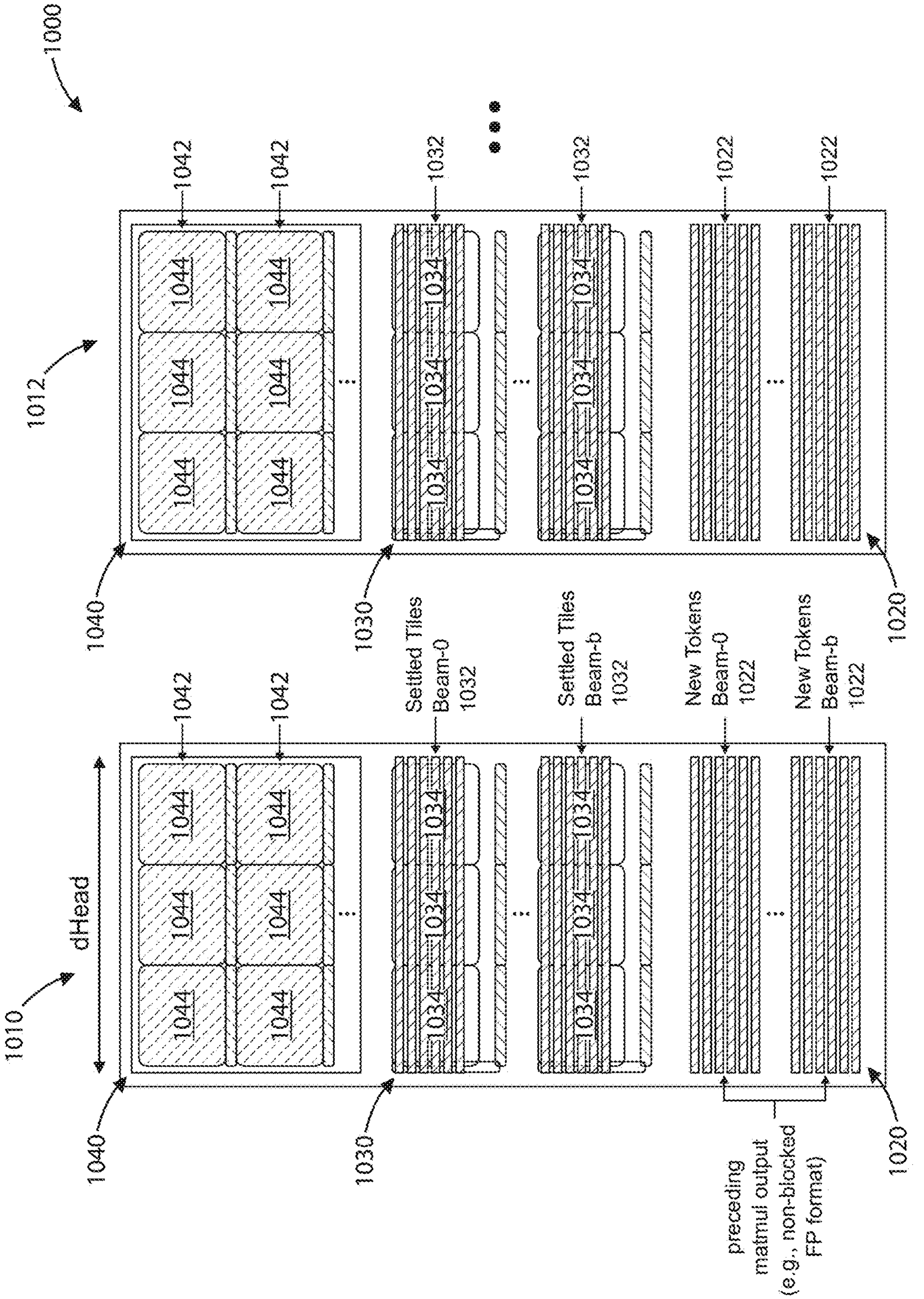
Figure 10C:
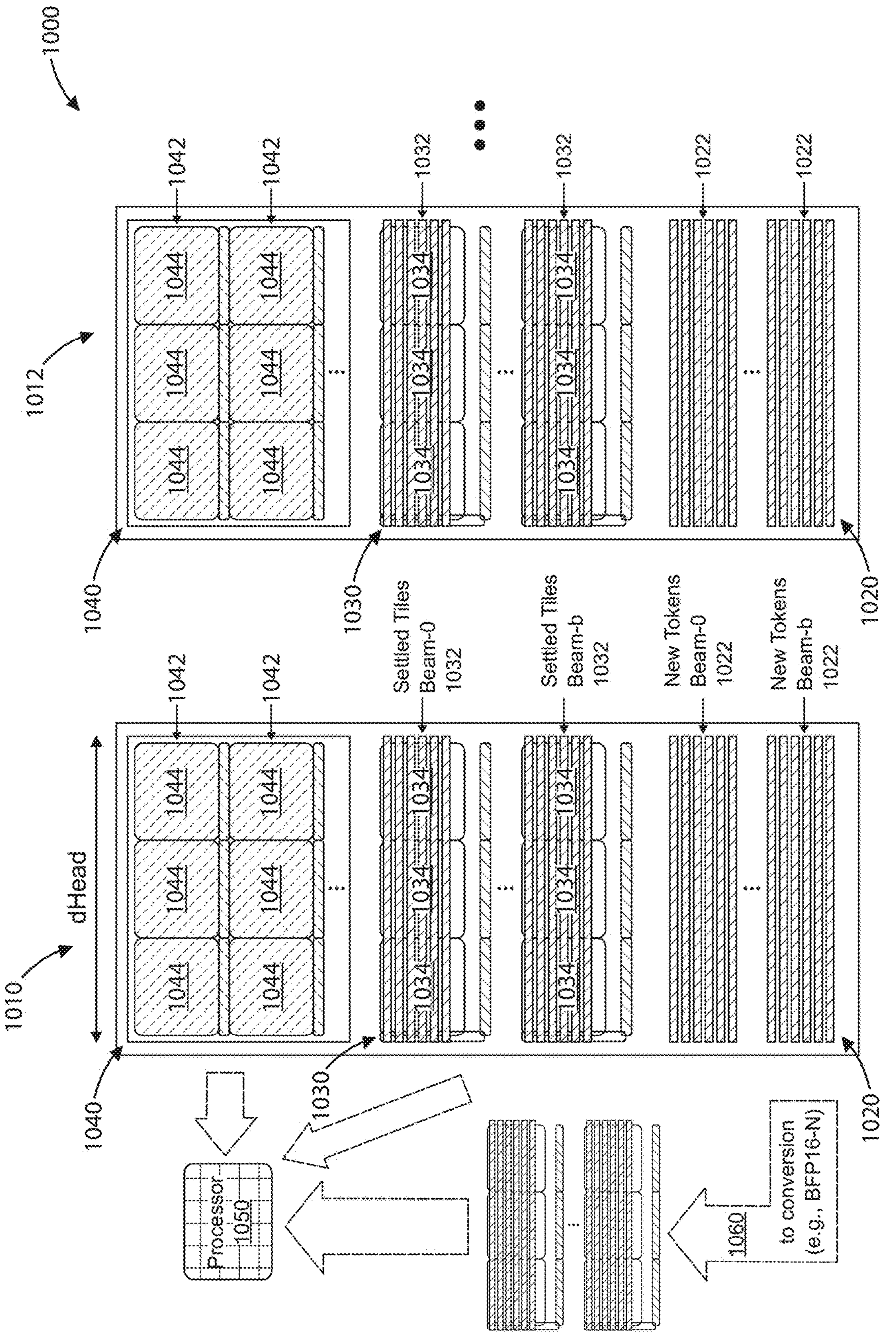

FIGS. 10A-10C are simplified block diagrams illustrating a hybrid memory cache device 1000 according to an example of the present invention. In a specific example, the cache device 1000 can be configured for handling the value data of the transformer model workload discussed previously. As shown in FIG. 10A, the cache device 1000 includes at least one or more cache units 1010 having a plurality of cache regions. For example, the plurality of cache regions can include at least a first cache region 1020 configured to store new input tokens in a first format, a second cache region 1030 configured to store converted tokens in a second format, and third cache region 1040 configured to store input/prompt tokens.

Here, the first cache region 1020 is configured to store a plurality of new tokens in a beam configuration ranging from "Beam-0" 1022 to "Beam-b" 1022, where "b" is a positive integer that can vary depending on the application. As indicated in FIG. 10B, the tokens in this first cache region 1020 are stored in a non-blocked format. In a specific example, these tokens are stored in an FP format, such as the FP8 formats shown in FIG. 8. These tokens can be converted to a blocked format in preparation for a matrix multiplication (matmul) operation (e.g., between the output of the softmax operation and the value matrix).

Similarly, the second cache region 1030 is shown in this example to store a plurality of converted tokens also in a beam configuration ranging from "Beam-0" 1032 to "Beam-b" 1032. Within these beams 1032, the converted tokens are configured as tiles 1034 (i.e., blocked format). As shown in FIG. 10C, the plurality of new tokens 1022 are read from the first cache region 1020 for a conversion operation 1060 that converts the new tokens 1022 to the blocked format. In a specific example, these tokens can be converted from an FP format (e.g., FP8, or the like) to a BFP format (e.g., BFP16-N, or the like).

FIG. 10C also shows that the processor 1050 can access data from any cache region of the cache unit 1010. In an example, the new tokens 1022 are read from the first cache region 1020 to be converted to the converted tokens 1032 in the blocked format and stored in the second cache region 1030. Then, the converted tokens 1032 are read from the second cache region 1030 for the multiplication operation with the softmax scores computed after the scaling of the dot product of the query and key matrices.

In an example, the cache device 1000 can be configured in a column-wise configuration and the plurality cache units can be configured as different cache levels of varying capacity and transfer speed. Also, the inputs used to generate the plurality of new tokens 1022 can be stored in the third cache region 1040 as a plurality of input tokens 1044. The plurality of input tokens 1044 can be configured in rows 1042, which can have varying dimensions depending on the application.

Figure 11A:
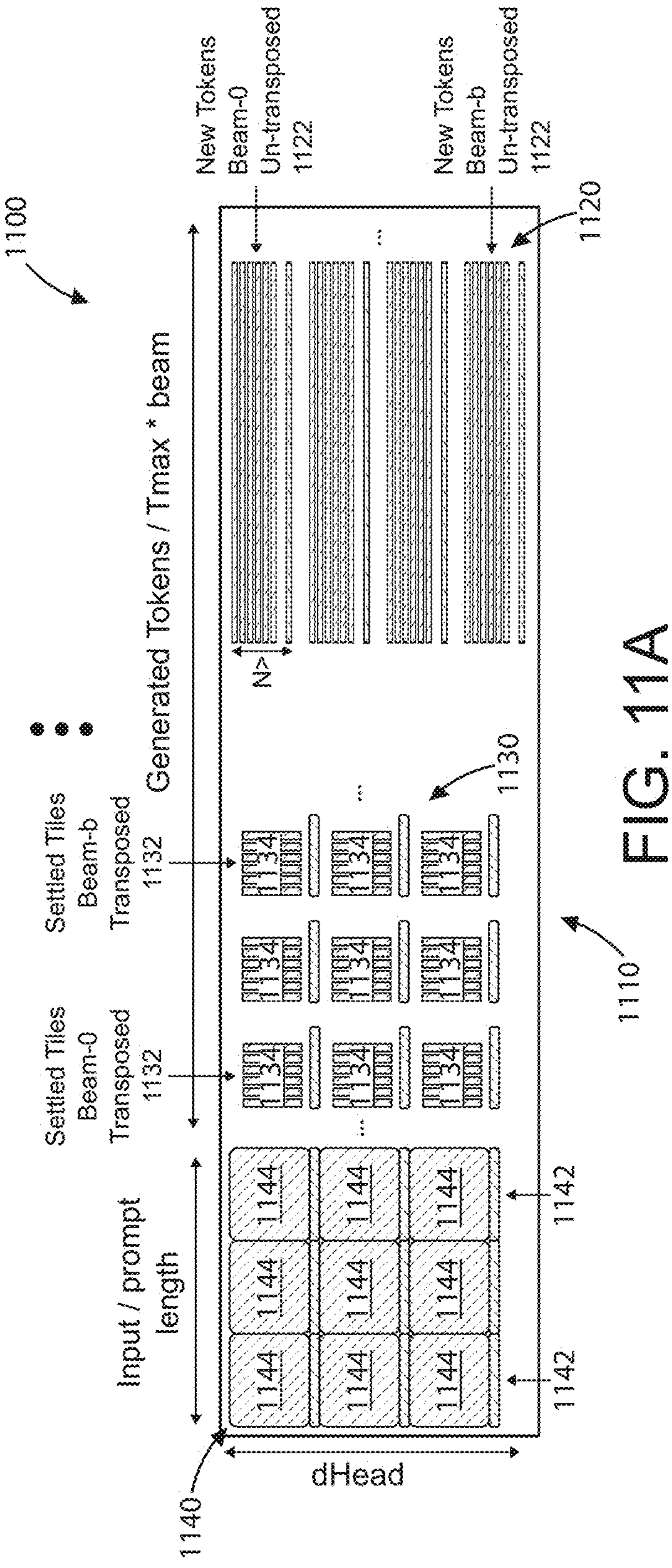
FIGS. 11A-11C are simplified block diagrams illustrating a hybrid memory cache device according to an example of the present invention.
Figure 11B:
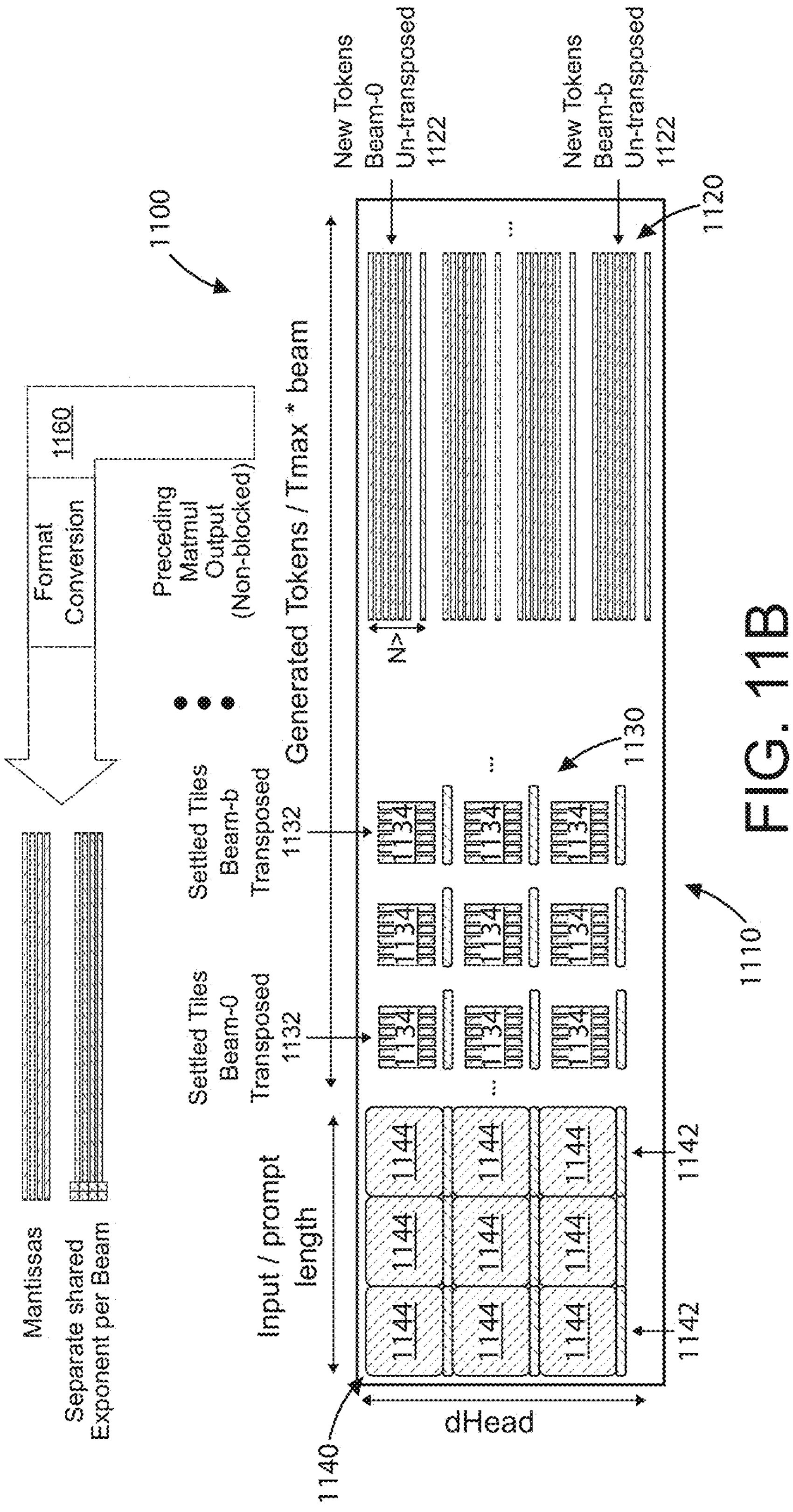
Figure 11C:
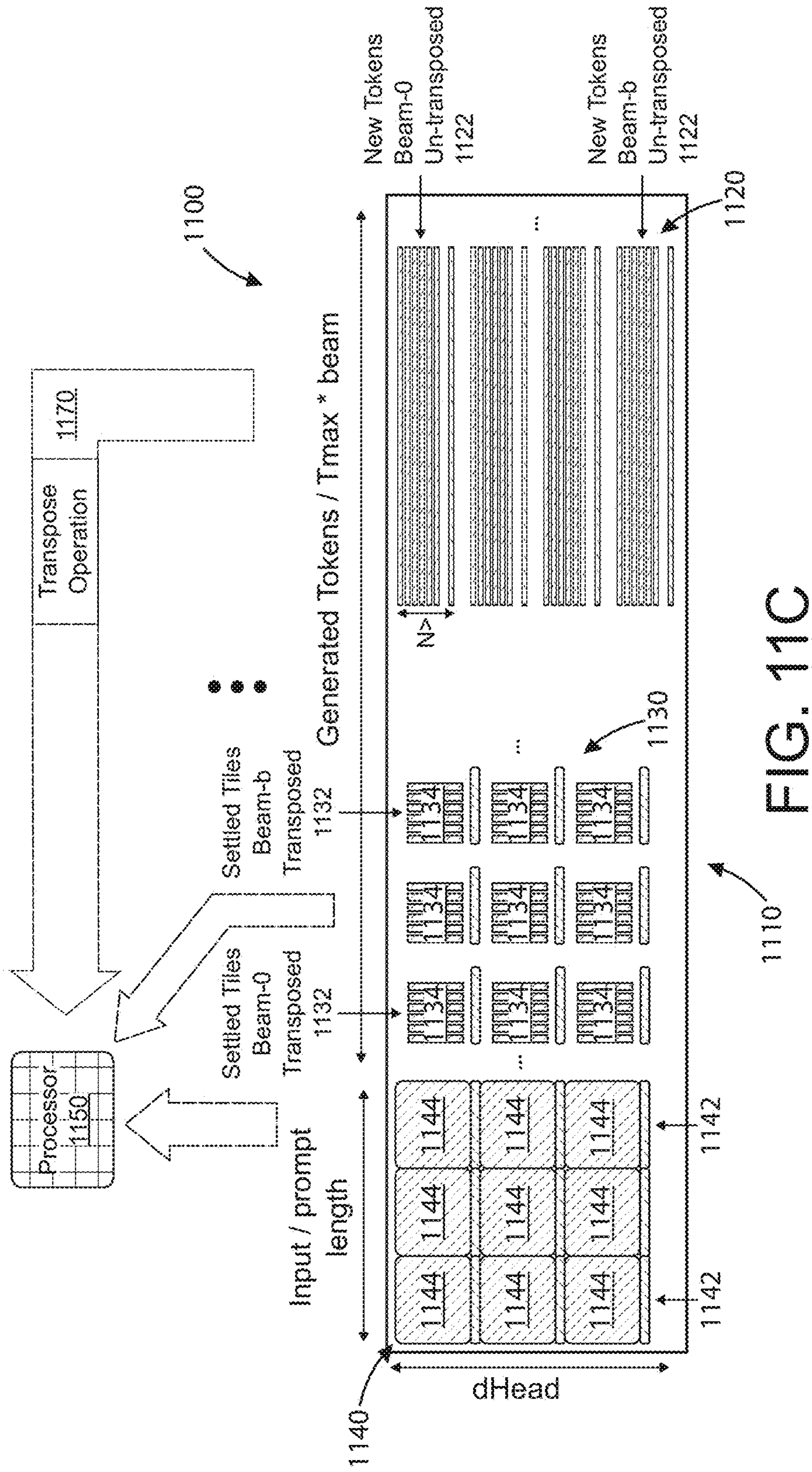

FIGS. 11A-11C are simplified block diagrams illustrating a hybrid memory cache device 1100 according to an example of the present invention. In a specific example, the cache device 1100 can be configured to handling the key data of the transformer workload discussed previously. As shown in FIG. 10A, the cache device 1100 includes at least one or more cache units 1110 having a plurality of cache regions. For example, the plurality of cache regions can include at least a first cache region 1120 configured to store new input tokens previously converted from a first format to a second format, a second cache region 1130 configured to store transposed tokens in the second format, and a third cache region 1140 configured to store input/prompt tokens.

Here, the first cache region 1120 is configured to store a plurality of new tokens in a beam configuration ranging from "Beam-0" 1122 to "Beam-b" 1124, where "b" is a positive integer that can vary depending on the application. As indicated in FIG. 11B, the tokens in this first cache region 1120 are stored in an un-transposed format. In a specific example, these tokens are stored in a BFP format, such as the BFP16-N format shown in FIG. 8. These tokens can be transposed in preparation for a matmul operation (e.g., between the query and transposed key matrices).

The second cache region 1130 is shown in this example to store a plurality of transposed tokens also in a beam configuration ranging from "Beam-0" 1132 to "Beam-b" 1132. Within these beams 1032, the transposed tokens are configured as tiles 1134. As shown in FIG. 11B, the plurality of new tokens 1122 are stored in the first cache region 1120 following a conversion operation 1160 that converts the new tokens 1022 to the second format. In a specific example, these tokens can be converted from an FP format (e.g., FP8, or the like) to a BFP format (e.g., BFP16-N, or the like). Here, the format conversion 1160 results in a plurality of mantissas and a separate shared exponent per beam.

FIG. 11C shows that the processor 1150 can access data from any cache region of the cache unit 1110. This can include storing the plurality of new tokens 1122 in the first cache region 1120 following the conversion from the first format to the second format. Also, the plurality of new tokens 1122 are read from the first cache region 1120 for a transpose operation 1170 and the transposed tokens 1132 are stored in the second cache region 1130. Then, the transposed tokens 1132 can be read from the second cache region 1130 for the multiplication operation between the query and transposed key matrices. The result of the multiplication operation can then be stored in the third cache region 1140 as a plurality of matrix outputs 1144.

In an example, the cache device 1100 can be configured in a row-wise configuration and the plurality cache units can be configured as different cache levels of varying capacity and transfer speed. Also, the inputs used to generate the plurality of new tokens 1122 can be stored in the third cache region 1140 as a plurality of input tokens 1144. The plurality of matrix outputs 1144 can be configured in columns 1142, which can have varying dimensions depending on the application.

In an example, the cache devices shown in FIGS. 10A-10C and FIGS. 11A-11C are hybrid cache devices. These cache devices can provide the benefit of avoiding repeated re-blocking of previously blocked data and avoid padding and de-padding operations to support transposed storage or byte alignment. Those of ordinary skill in the art will recognize other variations, modifications, and alternatives.

According to an example, the present invention relates to processing transformer workloads in a transformer compute apparatus. In certain applications, it is desirable to improve the handling of large data sizes. For example, transformer-based modeling networks typically involve an enormous number of elements (e.g., weights, activations, etc.) that cannot all be stored in on-chip memory. Thus, accessing these elements requires frequent transfers from a memory storage device (e.g., DDR), which can cause the processing of these elements to become memory bound due to the large latency of such memory operations. Additionally, quantizing the data into certain formats can pose challenges in cases in which the target matrix data is characterized by a changing contraction dimension due to redundant quantizations, potential accuracy reduction, and inefficient memory/cache transfers.

Figure 12A:
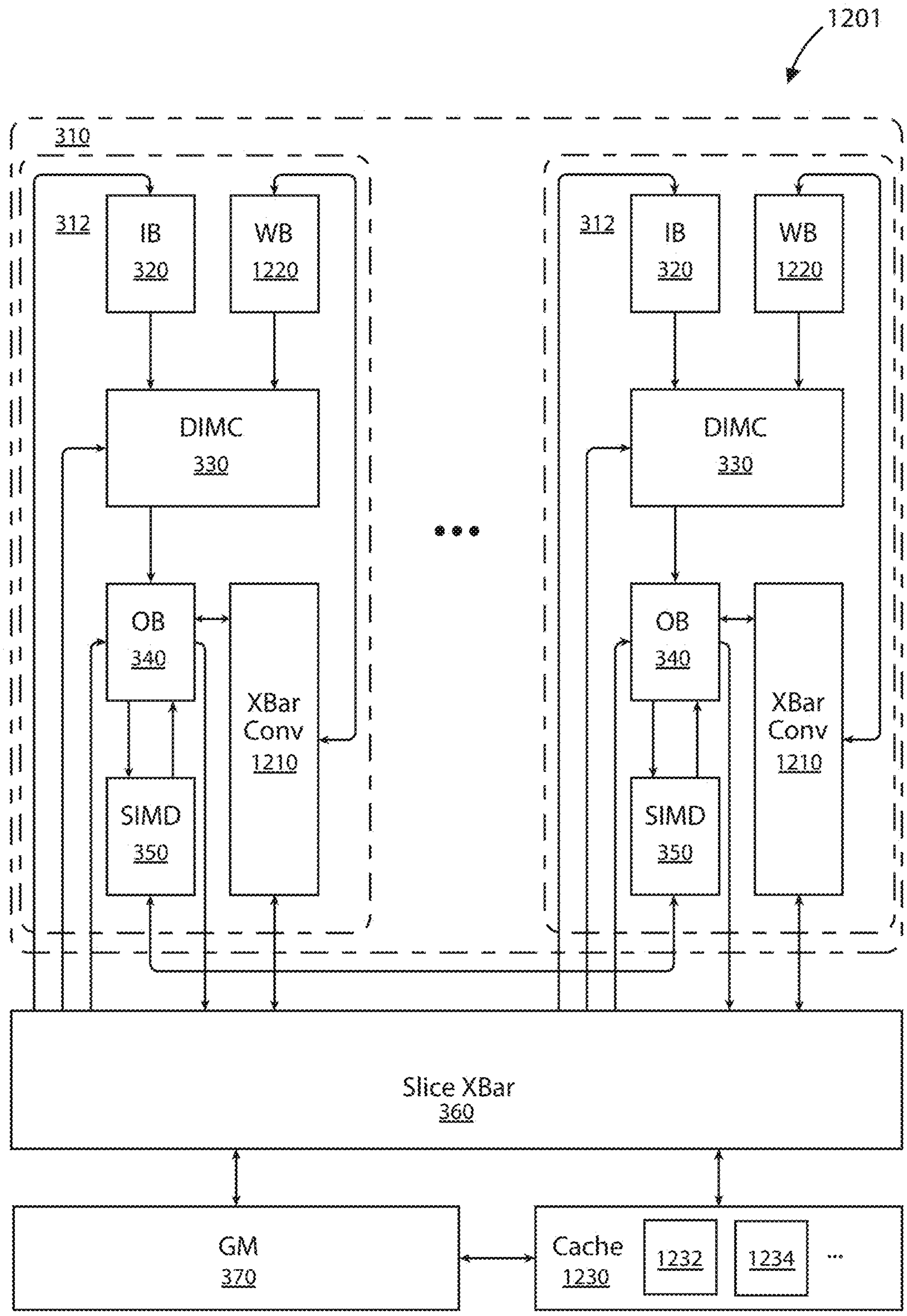
FIG. 12A is a simplified diagram illustrating a transformer compute apparatus according to an example of the present invention.

FIG. 12A is a simplified diagram illustrating a transformer compute apparatus 1201 (or matrix multiply compute apparatus) according to an example of the present invention. As shown, this apparatus can be configured similarly to the example slice device 301 of FIG. 3A. Any shared reference numerals between these figures refer to the same elements as described previously. In contrast, apparatus 1201 includes a cache memory device 1230 coupled to the crossbar 360 and the memory device 370. The cache memory device 1230 can include at least a first cache device 1232 and a second cache device 1234, which can be configured similarly to the cache devices 1000 and 1100, respectively. The cache memory device 1230 can include additional cache devices as well.

The apparatus 1201 also includes a crossbar converter device 1210 coupled to the crossbar 360, the input buffer (IB) device, and a weight buffer (WB) device 1220, which is coupled to the compute device 330. The converter device 1210 can receive data directly from the output buffer (OB) device or from the memory device 370 or the cache memory device 1230 via the crossbar device 360. And, the converter device 1210 can convert the data from a first format to a second format by determining a mantissa values and shared exponent values from the data in the first format. Then, these mantissas and shared exponents are stored in a blocking configuration in a designated memory location (e.g., memory device 370, cache memory device 1230, etc.). In a specific example, the first format can be a floating point (FP) format, while the second format can be a block floating point (BFP) format. Further, the crossbar device 360 can send the converted data to the IB device 320 and/or the WB device 1220 in preparation for processing by the compute device 330.

In an example, the WB device 1220 can be configured together with the input buffer (IB) device 320 as one buffer device. Also, the crossbar converter device 1210 can be configured together or separately within each compute path 312. Alternatively, the crossbar converter device 1210 can also be configured within the crossbar device 360 and be coupled to each compute path 312. Further details of the method of operating this apparatus are discussed below in FIGS. 13A-13D.

Figure 12B:
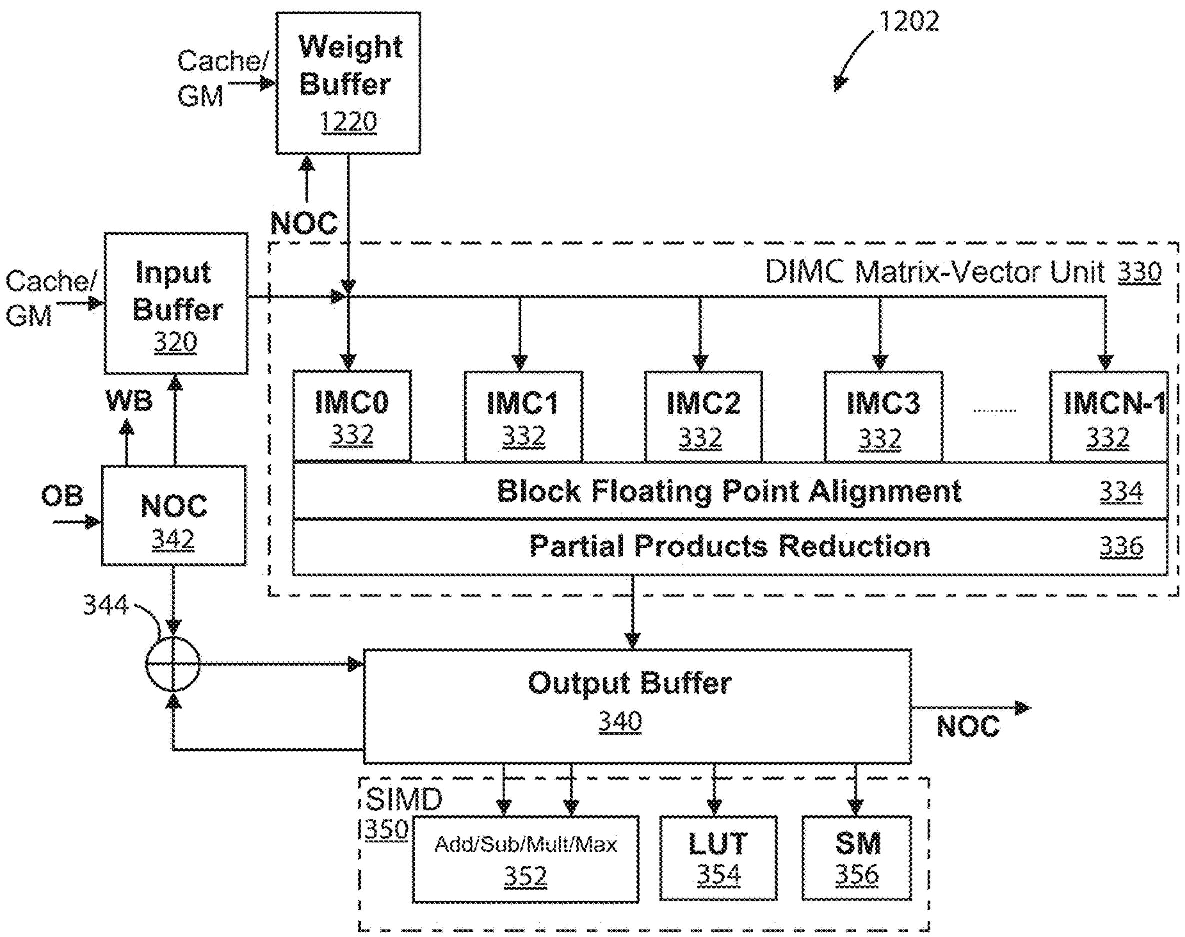
FIG. 12B is a simplified diagram illustrating a transformer compute apparatus according to an example of the present invention.

FIG. 12B is a simplified diagram illustrating a transformer compute apparatus 1202 (or matrix multiply compute apparatus) according to an example of the present invention. As shown, this apparatus 1202 can be configured similarly to the example slice device 302 of FIG. 3B. In contrast, apparatus 1202 includes the WB device 1220 coupled to the in-memory-compute (IMC) modules 332. Similar to the IB device 320, the WB device 1220 is also coupled to the network-on-chip (NOC) device 342 and to a memory device (denoted by input from "GM"). As discussed previously, the WB device 1220 can be configured together with the IB device 320.

Although previous examples discuss weight matrix elements, the present compression/decompression implementation can also be applied to other matrix elements, such as matrix activations. In this case (see FIG. 12A), the crossbar converter device 1210 is coupled to crossbar device 360 and the IB device 320, and the decompression method can be applied to a plurality of activation matrix elements or input matrix elements stored in the memory device 370.

This apparatus includes at least a data path having an IB device, a compute device coupled to the IB device, an OB device coupled to the compute device, and a SIMD device coupled to the OB device. One or more of these data paths, and each of the components therein, are coupled to a crossbar device, which is also coupled at least to a memory device. Further, a crossbar converter device can be configured within the crossbar device, or within each data path coupled the crossbar device and the OB device. In a specific example, the transformer compute apparatus can be configured in a low precision, high accuracy system for generative large language models (LLMs) with support for BFP numerics and storage. This apparatus can also be configured within a chiplet device and/or an AI accelerator device. Depending on the embodiment, this apparatus can include any of the elements and configurations discussed previously.

FIGS. 13A-13D illustrate a simplified flow diagram of a method 1300 of operating a transformer compute apparatus according to an example of the present invention. This method 1300 can be briefly summarized as follows:

1302. Receive, by the IB device, a plurality of matrix inputs in a first format;

1304. Store, by each of the third cache regions of the first and second cache devices, the plurality of matrix inputs;

1306. Determine first, second, and third projection tokens in the first format for each of the plurality of matrix inputs using the compute device;

1308. Store the first, second, and third projection tokens using the OB device;

1310. Store, by the first cache region of the first cache device, the plurality of first projection tokens;

1312. Determine, by the crossbar converter device, a plurality of converted second projection tokens in a second format using the plurality of second projection tokens from the OB device;

1314. Store, by the first cache region of the second cache device, the plurality of converted second projection tokens;

1316. Determine, by the crossbar converter device, a plurality of converted third projection tokens in the second format using the plurality of third projection tokens from the OB device;

1318. Store, by the memory device, the plurality of converted third projection tokens;

1320. Determine, by the crossbar converter device, a plurality of converted first projection tokens in the second format using the plurality of first projection tokens from the first cache region of the first cache device;

- 1322. Storing, by the second cache region of the first cache device, the plurality of converted first projection tokens;
- 1324. Determine, by the crossbar device, a plurality of transposed second projection tokens using the plurality of converted second projection tokens from the first cache region of the second cache device;
- 1326. Store, by the second cache region of the second cache device, the plurality of transposed second projection tokens;
- 1328. Determine, by the compute device and the SIMD device, a plurality of normalized score values using the plurality of converted third projection tokens from the memory device and the plurality of transposed second projection tokens from the second cache region of the second cache device;
- 1330. Store, by the OB device, the plurality of normalized score values;
- 1332. Store, by the memory device, the plurality of normalized score values;
- 1334. Determine, by the compute device, a plurality of weighted first projection tokens using the plurality of normalized score values from the memory device and the plurality of converted first projection tokens from the second cache region of the first cache device;
- 1336. Store, by the OB device, the plurality of weighted first projection tokens;
- 1338. Store, by the memory device, the plurality of weighted first projection tokens;
- 1340. Determine, by the compute device, a weighted tokens sum using the plurality of weighted first projection tokens from the memory device;
- 1342. Store, by the OB device, the weighted tokens sum;
- 1344. Store, by the memory device, the weighted tokens sum; and
- 1346. Perform other steps as desired.

The above sequence of steps is used to operate a transformer compute apparatus using hybrid caching according to one or more embodiments of the present invention. Depending on the embodiment, one or more of these steps can be combined, or removed, or other steps may be added without departing from the scope of the claims herein. One of ordinary skill in the art will recognize other variations, modifications, and alternatives. Further details of this method are provided below.

In step 1302, the method includes receiving a plurality of matrix inputs in a first format by the IB device. In an example, the matrix inputs can include inputs to a transformer model, such as the generative transform shown in FIG. 8. In the case of language learning models (LLMs), the inputs can include word embeddings, or the like. In an example, the first format includes a floating point (FP) format, or the like.

In step 1304, the method includes storing the plurality of matrix inputs in each of the third cache regions of the first and second cache devices. The first cache device can be configured similarly to the cache device 1000 shown in FIG. 10, and the second cache device can be configured similarly to the cache device 1100 shown in FIG. 11. In an example, the compute apparatus can also include a third cache device, which can be configured similarly to either cache devices 1000/1100 and to store the plurality of matrix inputs as well.

In step 1306, the method includes determining a first projection token (e.g., Value projection), a second projection token (e.g., Key projection), and a third projection token (e.g., Query projection) in the first format for each of the plurality of matrix inputs using the compute device. This includes multiplying each matrix input by a first, second, and third weight matrix that is determined by a training process. In an example, a weight buffer (WB) device can be coupled to the compute device and be configured to receive the weight matrices for determining these projection tokens.

In step 1308, the method includes storing the first, second, and third projection tokens in the OB device. These tokens can then be stored in the memory device, which can include main memory, cache memory, etc. Depending on the application, the memory device can store the tokens in a main memory location, or the memory device can be configured with additional cache devices configured for the tokens or outputs derived from these tokens. Then, in step 1310, the method includes storing the plurality of first projection tokens in the first cache region of the first cache device. In a specific example, these new tokens are stored in a non-blocked FP format.

In step 1312, the method includes determining a plurality of converted second projection tokens in a second format using the plurality of second projection tokens. As discussed previously, the second format can include a block floating point (BFP) format, or the like. This conversion process can be performed by the crossbar converter device, which can be configured similarly to the crossbar converter device 1210 shown in FIG. 12A. In an example, the crossbar converter device receives the plurality of second projection tokens and then determines a plurality of mantissas and a plurality of shared exponents. Depending on the application, the crossbar converter device can receive the second projection tokens directly from the OB device, or the second projection tokens can be stored in and retrieved from the memory device, or another cache device coupled to the crossbar device and the memory device.

In step 1314, the method includes storing the plurality of converted second projection tokens in the first cache region of the second cache device. More specifically, the pluralities of mantissas and shared exponents determined from the plurality of second projection tokens can be stored in a blocking configuration in this first cache region.

In an example, each of the first cache device and the second cache device are configured for a block-by-block storage process according to a predetermined block size (e.g., 16, 64, 128, etc.). For example, the block-by-block process for the converted first projection tokens can include accumulating the first projection tokens in one or more blocks according to the predetermined block size, converting each block of first projection tokens as it is accumulated in the first cache region of the first cache device, and storing each such block after it is converted.

Similarly, the block-by-block process for the converted second projection tokens can include accumulating the converted second projection tokens in one or more blocks according to the predetermined block size, transposing each block of the converted second projection tokens as it is accumulated in the first cache region of the second cache device, and storing each such block after it is transposed. The block-by-block process for the first cache device can provide the benefit of avoiding repeated re-blocking of previously blocked data. Also, block-by-block process can avoid padding and de-padding operations to support transposed storage or byte alignment. There can be other benefits from this block-by-block process as well.

In step 1316, the method includes determining a plurality of converted third projection tokens in the second format using the plurality of third projection tokens. In an example, this step includes using the crossbar converter device to determine a plurality of mantissa values and a plurality of shared exponents from the plurality of third projection tokens. Depending on the application, the crossbar converter device can receive the third projection tokens directly from the OB device, or the third projection tokens can be stored in and retrieved from a memory location (e.g., memory device, cache device, etc.).

In step 1318, the method includes storing the plurality of converted third projection tokens in the memory device. More specifically, the pluralities of mantissas and shared exponents determined from the plurality of third projection tokens can be stored in a blocking configuration in the memory device. Alternatively, the plurality of converted third projection tokens can be stored in another cache device coupled to the crossbar device and the memory device.

In step 1320, the method includes determining a plurality of converted first projection tokens in the second format using the plurality of first projection tokens from the first cache region of the first cache device. In an example, this step can includes using the crossbar converter device to determine a plurality of mantissa values and a plurality of shared exponents from the plurality of first projection tokens from the first cache region of the first cache device. Then, in step 1322, the method includes storing the plurality of converted first projection tokens in the second cache region of the first cache device. More specifically, the pluralities of mantissas and shared exponents determined from the plurality of first projection tokens can be stored in a blocking configuration in the second cache region of the first cache device.

In step 1324, the method include determining a plurality of transposed second projection tokens using the plurality of converted projection tokens from the second cache region of the second cache device. This process can be performed by the crossbar device, which can be configured similarly to the crossbar device 360 shown in FIG. 12A. In a specific example, a processor coupled to the crossbar device can be configured to apply a transpose operation to the plurality of converted second projection tokens, resulting in the plurality of transposed second projection tokens. Then, in step 1326, the method includes storing the plurality of transposed second projection tokens in the second cache region of the second cache device. The plurality of transposed second projection tokens is stored in the second format in the blocking configuration.

In step 1328, the method includes determining a plurality of normalized score values using the plurality of converted third projection tokens (e.g., Query tokens) from the memory device and the plurality of transposed second projection tokens (e.g., Key tokens) from the second cache region of the second cache device. In an example, the compute device can determine a plurality of score values using the plurality of converted second projection tokens and the plurality of converted third projection tokens. And, the SIMD device can apply a softmax operation to the plurality of score values, resulting in the plurality of normalized score values. Then, in steps 1330 and 1332, the method includes storing the plurality of normalized score values in the OB device and the memory device, respectively.

In step 1334, the method includes determining a plurality of weighted first projection tokens using the plurality of normalized score values from the memory device and the plurality of converted first projection tokens from the second cache region of the first cache device. And, in steps 1336 and 1338, the method includes storing the plurality of weighted first projection tokens in the OB device and the memory device, respectively.

In step 1340, the method includes determining a weighted tokens sum using the plurality of weighted first projection tokens from the memory device. And, in steps 1342 and 1344, the method includes storing the weighted tokens sum in the OB device and the memory device, respectively.

As discussed previously, the method includes steps for processing a transformer workload. The transformer compute apparatus can be configured to perform matrix calculations for a self-attention process to determine the relevancy between tokens (e.g., associations between words in language prediction models). Following these steps, other steps can be performed as desired, as represented by step 1346. For example, the weight tokens sum can be sent along to a feed-forward neural network for further processing, such as shown in FIGS. 6A and 6B.

While the above is a full description of the specific embodiments, various modifications, alternative constructions and equivalents may be used. As an example, the AI accelerator apparatus and chiplet devices and transformer compute devices can include any combination of elements described above, as well as outside of the present specification. Therefore, the above description and illustrations should not be taken as limiting the scope of the present invention which is defined by the appended claims.

What is claimed is:

1. A method of operating a transformer compute apparatus, the method comprising:

receiving, by an input buffer (IB) device coupled a crossbar device, a plurality of matrix inputs in a first format;

wherein a compute device is coupled to the IB device and the crossbar device, an output buffer (OB) device is coupled to the compute device and the crossbar device, and a crossbar converter device is coupled to the OB device and the crossbar device;

wherein a cache memory device is coupled to the crossbar device, the cache memory device having at least a first cache region, a second cache region, and a third cache region; and storing, by the third cache region, the plurality of matrix inputs;

determining at least a projection token in the first format for each of the plurality of matrix inputs using the compute device;

storing the plurality of projection tokens using the OB device;

storing, by the first cache region, the plurality of projection tokens;

determining, by the crossbar converter device, a plurality of converted projection tokens in a second format using the plurality of projection tokens from the first cache region;

storing, by the second cache region, the plurality of converted first projection tokens in a blocking configuration;

determining, by the compute device, a plurality of weighted projection tokens using at least the plurality of converted projection tokens from the second cache region.

2. The method of claim 1 wherein the first format comprises a floating point (FP) format, and wherein the second format comprises a block floating point (BFP) format.

3. The method of claim 1 wherein determining the plurality of converted projection tokens in the second format comprises determining, by the crossbar converter device, a plurality of mantissa values and a plurality of shared exponents using the plurality of projection tokens from the first cache region.

4. The method of claim 1 wherein storing the plurality of projection tokens by the first cache region comprises accumulating the plurality of projection tokens in one or more blocks according to a predetermined block size.

5. The method of claim 1 wherein determining the plurality of converted projection tokens comprises converting the plurality of projection tokens in a block-by-block process according to a predetermined block size.

6. The method of claim 1 wherein the cache memory device is configured for a block-by-block storage process according to a predetermined block size.

7. A method of operating a transformer compute apparatus, the method comprising:

receiving, by an input buffer (IB) device coupled a crossbar device, a plurality of matrix inputs in a first format;

wherein a compute device is coupled to the IB device and the crossbar device, an output buffer (OB) device is coupled to the compute device and the crossbar device, a Single Instruction, Multiple Data (SIMD) device is coupled to the OB device, and a crossbar converter device is coupled to the OB device and the crossbar device;

wherein a cache memory device is coupled to the crossbar device, the cache memory device having at least a first cache region, a second cache region, and a third cache region; and storing, by the third cache region, the plurality of matrix inputs;

determining at least a projection token in the first format for each of the plurality of matrix inputs using the compute device;

storing the plurality of projection tokens using the OB device;

determining, by the crossbar converter device, a plurality of converted projection tokens in a second format using the plurality of projection tokens from the OB device;

storing, by the first cache region, the plurality of converted projection tokens in a blocking configuration;

determining, by the crossbar device, a plurality of transposed projection tokens using the plurality of converted projection tokens from the first cache region;

storing, by the second cache region, the plurality of transposed projection tokens in the blocking configuration;

determining, by the compute device and the SIMD device, a plurality of normalized score values using at least the plurality of transposed projection tokens from the second cache region.

8. The method of claim 7 wherein the first format comprises a floating point (FP) format, and wherein the second format comprises a block floating point (BFP) format.

9. The method of claim 7 wherein determining the plurality of converted projection tokens comprises determining, by the crossbar converter device, a plurality of mantissa values and a plurality of shared exponents using the plurality of projection tokens.

10. The method of claim 7 wherein determining the plurality of transposed projection tokens comprises applying, by a processor coupled to the crossbar device, a transpose operation to the plurality of converted projection tokens from the first cache region.

11. The method of claim 7 wherein determining the plurality of normalized score values comprises determining, by the compute device, a plurality of score values using at least the plurality of transposed projection tokens; and applying, by the SIMD device, a softmax operation to the plurality of score values resulting in the plurality of normalized score values.

12. The method of claim 7 wherein storing the plurality of converted projection tokens by the first cache region comprises accumulating the plurality of converted projection tokens in one or more blocks according to a predetermined block size;

wherein determining the plurality of transposed projection tokens comprises transposing each block of the plurality of converted projection tokens after the block is accumulated in the first cache region; and wherein storing the transposed projection tokens by the second cache region comprises storing each block of the plurality of transposed projection tokens after the block is converted.

13. The method of claim 7 wherein determining the plurality of transposed projection tokens comprises transposing the plurality of converted projection tokens in a block-by-block process according to a predetermined block size.

14. The method of claim 7 wherein the cache memory device is configured for a block-by-block storage process according to a predetermined block size.

15. A transformer compute apparatus, the apparatus comprising:

an input buffer (IB) device coupled to a crossbar device, the IB device being configured to receive a plurality of matrix inputs in a first format;

a compute device coupled to the IB device and the crossbar device; wherein the compute device is configured to determine at least a projection token in the first format for each of the plurality of matrix inputs;

an output buffer (OB) device coupled to the compute device and the crossbar device; wherein the OB device is configured to store the plurality of projection tokens;

a cache memory device coupled to the crossbar device; wherein the cache memory device comprises at least a first cache region, a second cache region, and a third cache region; wherein the third cache region is configured to store the plurality of matrix inputs; and wherein the first cache region is configured to store the plurality of projection tokens;

a crossbar converter device coupled to the OB device and the crossbar device; wherein the crossbar converter device is configured to determine a plurality of converted projection tokens in the second format using the plurality of projection tokens from the first cache region;

wherein the second cache region is configured to store the plurality of converted projection tokens in a blocking configuration; and wherein the compute device is configured to determine a plurality of weighted projection tokens using at least the plurality of converted projection tokens from the second cache region.

16. The apparatus of claim 15 wherein the first format comprises a floating point (FP) format, and wherein the second format comprises a block floating point (BFP) format.

17. The apparatus of claim 15 wherein the crossbar converter device is configured to determine a plurality of mantissa values and a plurality of shared exponents using the plurality of projection tokens from the first cache region to determine the plurality of converted projection tokens.

18. The apparatus of claim 15 wherein the cache memory device is configured to store the plurality of projection tokens in the first cache region by accumulating the plurality of projection tokens in one or more blocks according to a predetermined block size.

19. The apparatus of claim 15 wherein the crossbar converter device is configured to determine the plurality of converted projection tokens by converting the plurality of projection tokens in a block-by-block process according to a predetermined block size.

20. The apparatus of claim 15 wherein the cache memory device is configured for a block-by-block storage process according to a predetermined block size.

21. A transformer compute apparatus, the apparatus comprising:

an input buffer (IB) device coupled to a crossbar device, the IB device being configured to receive a plurality of matrix inputs in a first format;

a compute device coupled to the IB device and the crossbar device; wherein the compute device is configured to determine at least a projection token in the first format for each of the plurality of matrix inputs;

an output buffer (OB) device coupled to the compute device and the crossbar device; wherein the OB device is configured to store the plurality of projection tokens;

a cache memory device coupled to the crossbar device; wherein the cache memory device comprises at least a first cache region, a second cache region, and a third cache region; wherein the third cache region is configured to store the plurality of matrix inputs;

a crossbar converter device coupled to the OB device and the crossbar device; wherein the crossbar converter device is configured to determine a plurality of converted projection tokens in a second format using the plurality of projection tokens from the OB device;

wherein the first cache region is configured to store the plurality of converted projection tokens in a blocking configuration;

wherein the crossbar device is configured to determine a plurality of transposed projection tokens using the plurality of converted projection tokens from the first cache region;

wherein the second cache region is configured to store the plurality of transposed projection tokens in the blocking configuration; and a Single Input, Multiple Data (SIMD) device coupled to the OB device, wherein the SIMD device is configured with the compute device to determine a plurality of normalized score values using at least the plurality of transposed projection tokens from the second cache region.

22. The apparatus of claim 21 wherein the first format comprises a floating point (FP) format, and wherein the second format comprises a block floating point (BFP) format.

23. The apparatus of claim 21 wherein the crossbar converter device is configured to determine a plurality of mantissa values and a plurality of shared exponents using the plurality of projection tokens to determine the plurality of converted projection tokens.

24. The apparatus of claim 21 wherein a processor coupled to the crossbar device is configured to apply a transpose operation to the plurality of converted projection tokens from the first cache region to determine the plurality of transposed projection tokens.

25. The apparatus of claim 21 wherein the compute device is configured to determine a plurality of score values using at least the plurality of transposed projection tokens; and wherein the SIMD device is configured to apply a softmax operation to the plurality of score values resulting in the plurality of normalized score values.

26. The apparatus of claim 21 wherein the cache memory device is configured to store the plurality of converted projection tokens by in first cache region by accumulating the plurality of converted projection tokens in one or more blocks according to a predetermined block size;

wherein the crossbar device is configured to determine the plurality of transposed projection tokens by transposing each block of the plurality of converted projection tokens after the block is accumulated in the first cache region; and wherein the cache memory device is configured to store the transposed projection tokens in the second cache region by storing each block of the plurality of transposed projection tokens after the block is converted.

27. The apparatus of claim 21 wherein the crossbar device is configured to determine the plurality of transposed projection tokens by transposing the plurality of converted projection tokens in a block-by-block process according to a predetermined block size.

28. The apparatus of claim 21 wherein the cache memory device is configured for a block-by-block storage process according to a predetermined block size.

* * * * *